(12) United States Patent
Giffen et al.

(10) Patent No.: US 11,422,602 B2
(45) Date of Patent: Aug. 23, 2022

(54) COMPUTING DEVICE REMOTE CONTROL SYSTEM

(71) Applicant: Dell Products L.P., Round Rock, TX (US)

(72) Inventors: Jonathan C. Giffen, Austin, TX (US); Pradeep Gopal, Round Rock, TX (US); Daniel Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 16/908,316

(22) Filed: Jun. 22, 2020

(65) Prior Publication Data

US 2021/0397237 A1  Dec. 23, 2021

(51) Int. Cl.
G06F 1/28 (2006.01)
G06F 1/3209 (2019.01)
H04L 9/32 (2006.01)

(52) U.S. Cl.
CPC .............. G06F 1/28 (2013.01); G06F 1/3209 (2013.01); H04L 9/3247 (2013.01)

(58) Field of Classification Search
CPC ......... G06F 1/28; G06F 1/3209; H04L 9/3247
See application file for complete search history.

(56) References Cited

U.S. PATENT DOCUMENTS

| | | | | |
|---|---|---|---|---|
| 6,802,010 B1* | 10/2004 | Kim | ................. | H04N 21/42206 726/20 |
| 6,941,114 B1* | 9/2005 | Kuo | ........................ | H04B 1/40 455/334 |
| 6,963,935 B1* | 11/2005 | Young | ................... | G06F 3/0227 345/161 |
| 8,212,394 B2* | 7/2012 | Lee | .......................... | H02J 3/14 307/38 |
| 9,310,864 B1* | 4/2016 | Klein | .................... | G06F 1/3206 |
| 2005/0076252 A1* | 4/2005 | Birmingham | .......... | G06F 1/266 713/310 |
| 2007/0256126 A1* | 11/2007 | Erickson | ........... | H04N 21/42204 726/20 |
| 2008/0059819 A1* | 3/2008 | Kim | ..................... | G06F 1/3209 713/324 |

(Continued)

*Primary Examiner* — Aurel Prifti
(74) *Attorney, Agent, or Firm* — Joseph Mencher

(57) ABSTRACT

A computing device remote control system includes a remote-control device, a remote-control adapter that is communicatively coupled to the remote-control device, and a computing device including a computing device Universal Serial Bus (USB) connector that is connected to the remote-control adapter. A function controller in the computing device is coupled to the computing device USB connector and operates to receive a remote-control message from the remote-control device via the computing device USB connector and the remote-control adapter and, in response, change a control function state stored in the function controller, and generate and transmit an alert. A system controller in the computing device is coupled to the function controller and operates to receive the alert from the function controller and, in response, access the function controller to identify the control function state stored in the function controller, and perform at least one control operation based on the control function state.

20 Claims, 26 Drawing Sheets

(56) References Cited

U.S. PATENT DOCUMENTS

| | | | |
|---|---|---|---|
| 2008/0129692 A1* | 6/2008 | Sween | G06F 3/0227 345/157 |
| 2012/0032776 A1* | 2/2012 | Wu | G08C 23/04 340/5.6 |
| 2012/0075651 A1* | 3/2012 | Sasase | H04N 1/00896 358/1.13 |
| 2015/0003630 A1* | 1/2015 | Qian | H04W 4/80 381/79 |
| 2015/0326659 A1* | 11/2015 | Cheng | H04L 29/08 713/170 |
| 2016/0085280 A1* | 3/2016 | Harel | G06F 1/266 710/14 |
| 2016/0277790 A1* | 9/2016 | Nakajima | H04N 21/43637 |
| 2017/0010654 A1* | 1/2017 | Chen | G06F 1/3265 |
| 2017/0133843 A1* | 5/2017 | McNeill-McCallum | H02J 3/00 |
| 2017/0260905 A1* | 9/2017 | Schmitz | F02C 7/185 |
| 2017/0269664 A1* | 9/2017 | Garner | H04N 21/4882 |
| 2017/0295028 A1* | 10/2017 | Pelissier | H04L 12/10 |
| 2018/0014075 A1* | 1/2018 | Lewis | H04N 21/43635 |
| 2018/0107246 A1* | 4/2018 | Dees | H04W 12/08 |
| 2018/0234637 A1* | 8/2018 | Marino | G06F 3/167 |
| 2018/0348848 A1* | 12/2018 | Bower, III | G06F 1/24 |
| 2019/0305980 A1* | 10/2019 | D'Ovidio | H04L 12/2803 |
| 2021/0232195 A1* | 7/2021 | Keilers | G06F 13/4282 |

\* cited by examiner

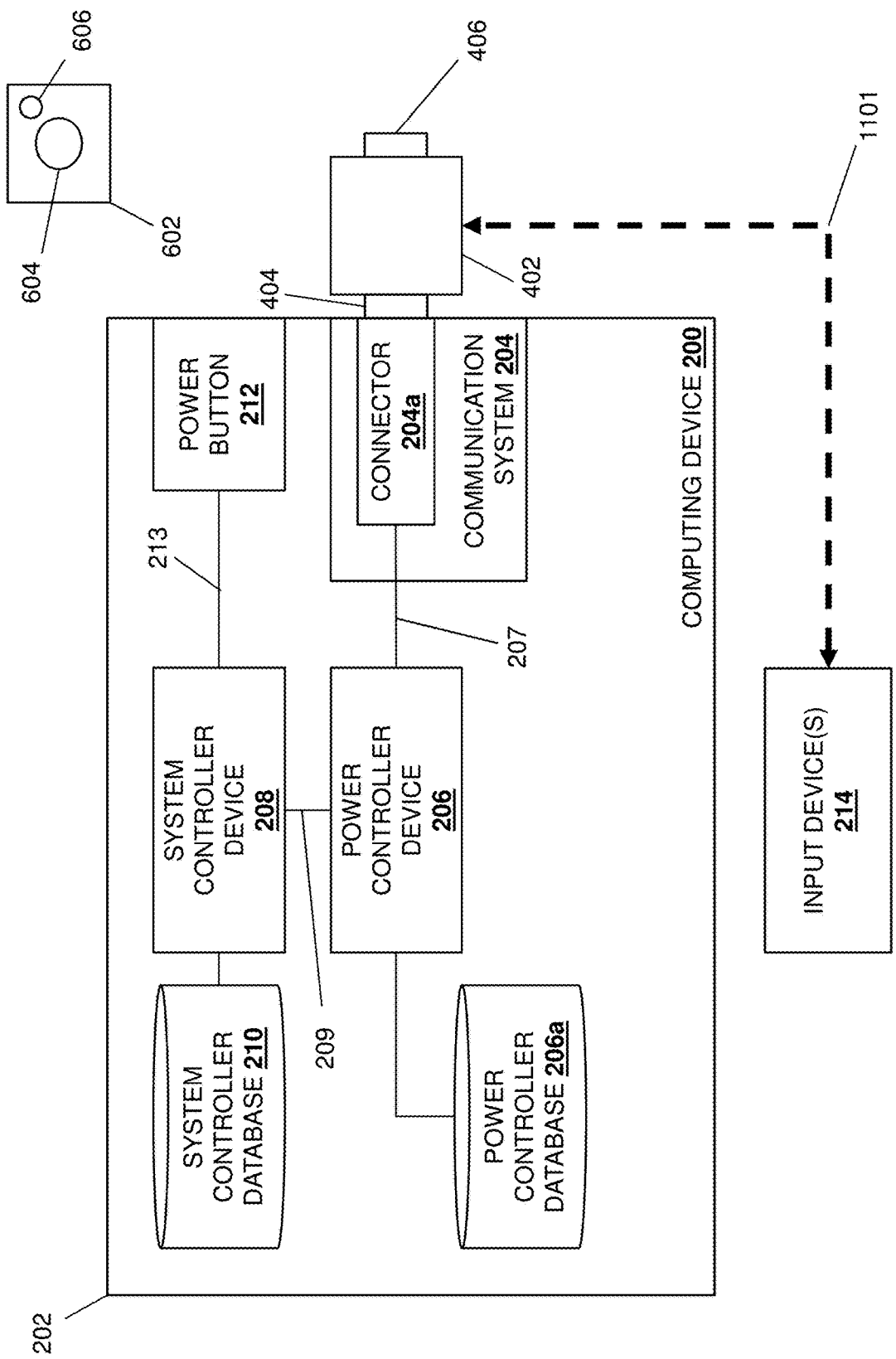

COMPUTING DEVICE REMOTE CONTROL SYSTEM

BACKGROUND

The present disclosure relates generally to information handling systems, and more particularly to controlling information handling systems remotely.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, server computing devices, and/or other computing devices known in the art, may sometimes be positioned remotely and/or inaccessibly from a user in a manner that limits or prevents physical access to that computing devices. For example, desktop computing devices may be positioned inside a desk, on a floor under a desk, in a drawer or cabinet of the desk, and/or in a variety of other desktop computing locations known in the art, while server computing devices may be positioned in a rack, cabinet, or other server computing device locations known in the art. Furthermore, one of skill in the art in possession of the present disclosure will appreciate that such computing device locations may provide enhanced security by locking or otherwise securing in a manner that prevents physical access to the computing device. As such, in many situations, it may be difficult for a user to physically access their computing device, which in turn makes it difficult to interface with physical control subsystems on the computing device in order to control it.

For example, located computing devices in the manner discussed above may make it difficult for a user to access a physical power button on the computing device that operates to power the computing device on or off. As would be appreciated by one of skill in the art in possession of the present disclosure, computing devices may be powered off using software power controls presented on the computing device when it is operating, but actuation of the physical power button on the computing device may be required to perform a "hard shutdown" of the computing device (e.g., to the lowest power state available to that computing device), and/or perform other power-down control operations known in the art. Furthermore, once powered down, actuation of the physical power button on the computing device may be required to power the computing device back on, thus requiring the user to obtain physical access to the computing device and its power button in order to render that computing device usable after the computing device has been powered down. Conventional computing devices address such issues by providing a remote power button that may be cabled to the computing device, but conventional remote power buttons require multiple cables connected via dedicated remote power button/power control connectors on the computing device, which requires connector space that may not be available on some computing devices.

Accordingly, it would be desirable to provide a computing device remote control system that addresses the issues discussed above.

SUMMARY

According to one embodiment, an Information Handling System (IHS) includes at least one processing system; and at least one memory system that is coupled to the at least one processing system and that includes instructions that, when executed by the at least one processing system, cause the at least one processing system to provide at least one controller engine that is configured to: receive a remote-control message from a remote-control device via a Universal Serial Bus (USB) connector and a remote-control adapter that is connected to the USB connector and that is communicatively coupled to the remote-control device; change, in response to receiving the remote-control message, a control function state stored in a database; generate an alert; access, in response to the alert, the control function state stored in the database; and perform at least one control operation based on the control function state.

BRIEF DESCRIPTION OF THE DRAWINGS

FIG. 11B is a schematic view illustrating an embodiment of the operation of the computing device remote control system of FIG. 9.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
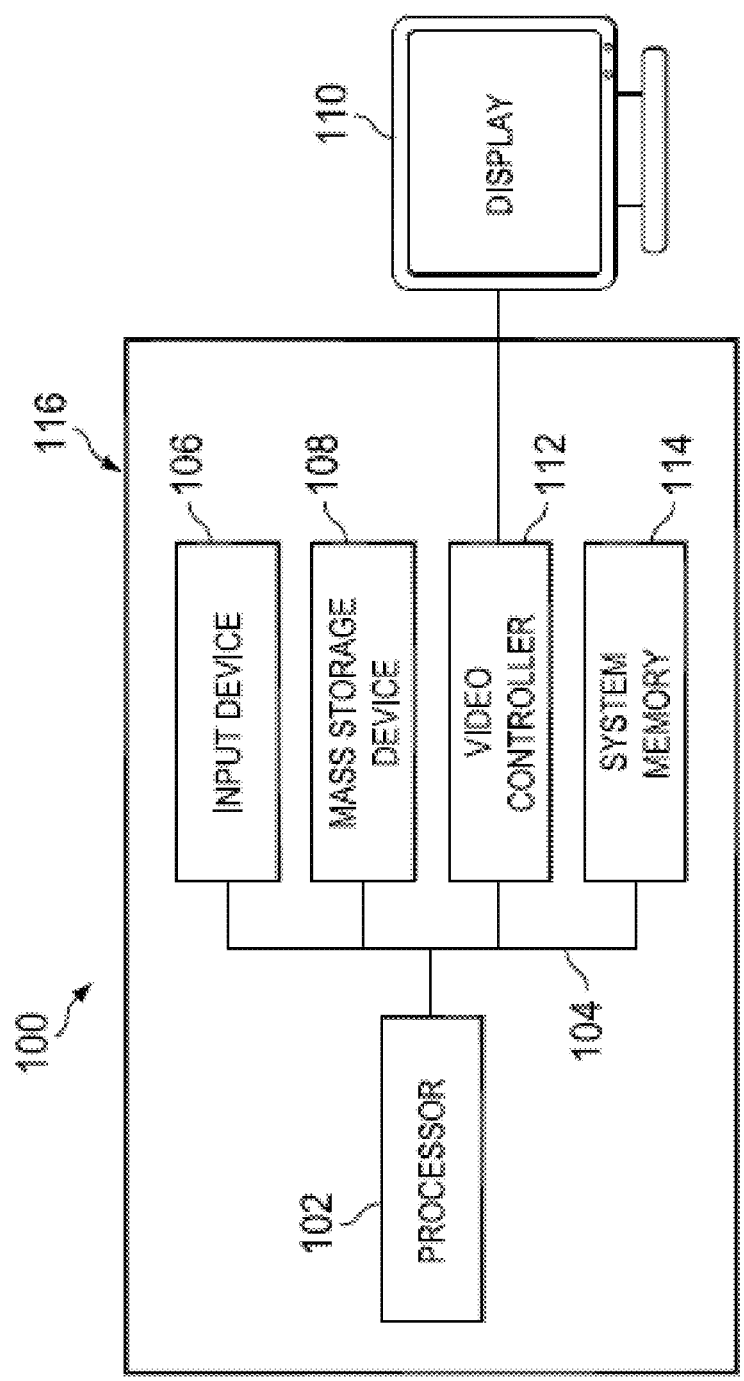
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
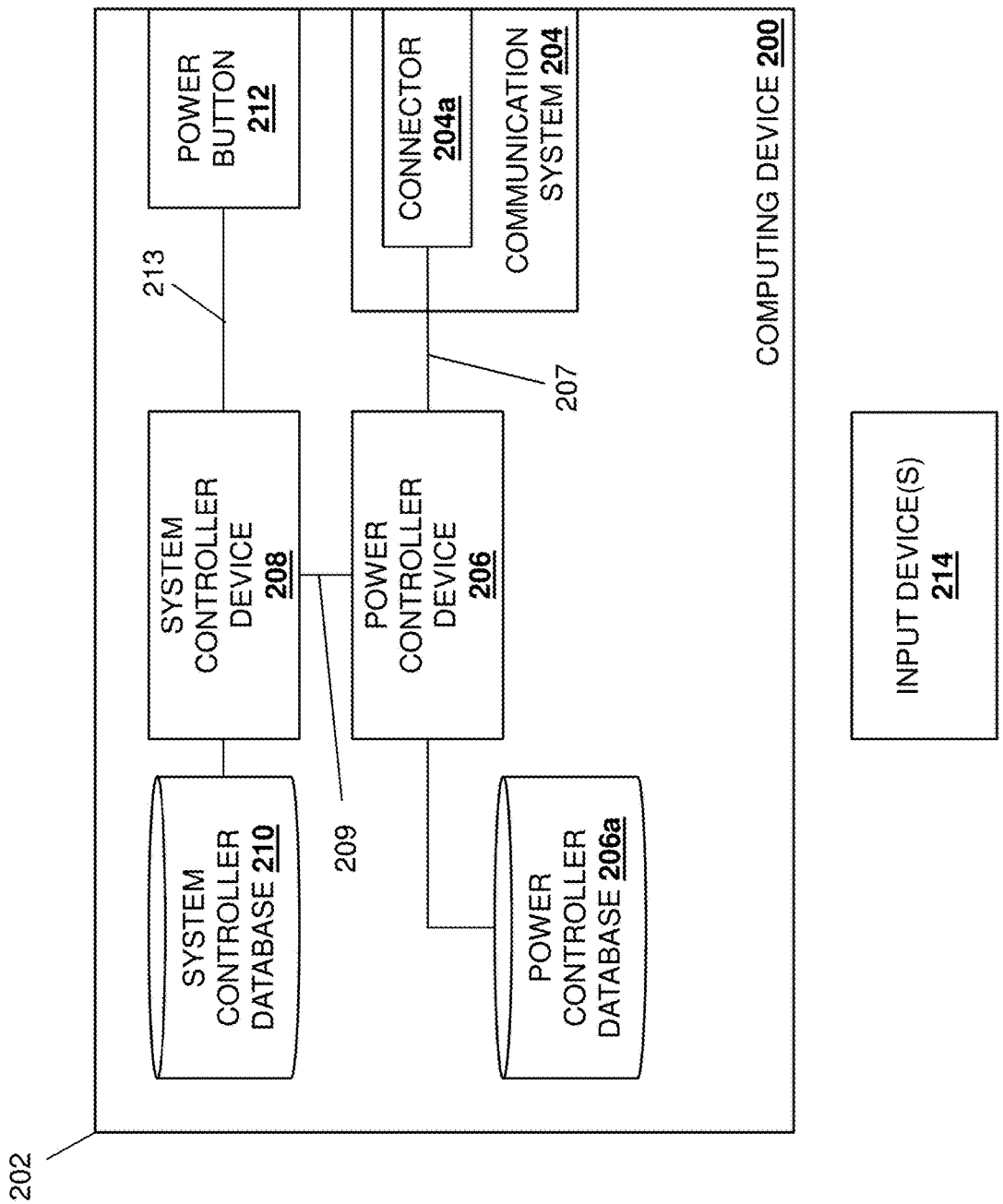
FIG. 2 is a schematic view illustrating an embodiment of a computing device that may utilize the computing device remote control system of the present disclosure.

Referring now to FIG. 2, an embodiment of a computing device 200 is illustrated that may utilize the computing device remote control system of the present disclosure. In an embodiment, the computing device 200 may be provided by the IHS 100 discussed above with reference to FIG. 1 and/or may include some or all of the components of the IHS 100, and in the specific examples below is described as being provided by a desktop computing device or a server computing device. In a specific example, the computing device 200 may be provided by an OPTIPLEX® Ultra Form Factor 3090 (or 7090) computing device available from DELL® Inc. of Round Rock, Tex., United States. However, while illustrated and discussed as being provided by a desktop computing device, server computing device, or specific computing device, one of skill in the art in possession of the present disclosure will recognize that the computing device remote control functionality of the discussed below may be utilized by other devices that are configured to operate similarly as computing device 200 discussed below. In the illustrated embodiment, the computing device 200 includes a chassis 202 that houses the components of the computing device 200, only some of which are illustrated and discussed below.

In the illustrated embodiment, the chassis 202 houses a communication system 204 having a connector 204*a* that, in the examples discussed below, is provided by a Universal Serial Bus (USB) Type-C connector, although one of skill in the art in possession of the present disclosure will appreciate that other connectors will fall within the scope of the present disclosure as well. Furthermore, while not illustrated or discussed herein, the communication system 204 may include additional connectors and/or other communication components (a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure) while remaining within the scope of the present disclosure.

In the illustrated embodiment, the chassis 202 also houses a function controller that is illustrated and described in the examples below as a power controller device 206 that is coupled to the connector 204a in the communication system 204 and that may include a power controller processing system (not illustrated, but which may include the processor 102 discussed above with reference to FIG. 1) and a power controller memory system (not illustrated, but which may include the memory 114 discussed above with reference to FIG. 1) that is coupled to the power controller processing system and that includes instructions that, when executed by the power controller processing system, cause the power controller processing system to provide a power controller engine that is configured to perform the functionality of the power controller engines and/or power controller devices discussed below. However, while a power controller device 206 is described as providing the function controller of the present disclosure, one of skill in the art in possession of the present disclosure will appreciate that other types of function controllers that control other types of computing device functions will fall within the scope of the present disclosure as well.

In a specific example, the power controller device 206 may be provided by a Power Delivery (PD) controller that is coupled to the connector 204a provided by a USB Type-C connector (e.g., a USB Type-C female connecter in the examples below) via a controller channel 207 such as the USB Communication Channel (CC) line discussed below and, while not illustrated in FIG. 2, one of skill in the art in possession of the present disclosure will recognize that the connector 204a provided by a USB Type-C connector may be connected to a power system in the computing device 200 via a power line, as well as to one or more devices in the computing device 200 via high speed communication channels, while remaining within the scope of the present disclosure as well. However, while specific examples of the power controller device 206, the connector 204a, and the connections between them have been described, one of skill in the art in possession of the present disclosure will recognize that other power controller devices and connectors may be provided and coupled together in other configurations while remaining within the scope of the present disclosure as well. In an embodiment, the chassis 202 may house a storage device (not illustrated, but which may include the storage device 108 discussed above with reference to FIG. 1) that is coupled to the power controller device 206 and that may include a power controller database 206a that is configured to store any of the information utilized by the power controller device 206a as discussed below. Furthermore, while illustrated as coupled to the power controller device 206, one of skill in the art in possession of the present disclosure will recognize that the power controller database 206a may be included in (e.g., stored in) the power controller device 206 while remaining within the scope of the present disclosure as well.

In the illustrated embodiment, the chassis 202 also houses a system controller device 208 that is coupled to the power controller device 206 and that may include a system controller processing system (not illustrated, but which may include the processor 102 discussed above with reference to FIG. 1) and a system controller memory system (not illustrated, but which may include the memory 114 discussed above with reference to FIG. 1) that is coupled to the system controller processing system and that includes instructions that, when executed by the system controller processing system, cause the system controller processing system to provide a system controller engine that is configured to perform the functionality of the system controller engines and/or system controller devices discussed below. A specific example, the system controller device 208 may be provided by a System Embedded Controller (EC) that may be coupled to power controller device 206 via one or more communication channels 209 (e.g., the alert communication channel and the Inter-Integrated Circuit (I$^2$C) communication channel discussed below). However, while specific examples of the system controller device 208 and its connections to the power controller device 206 have been described, one of skill in the art in possession of the present disclosure will recognize that other system controller devices may be provided and coupled to the power controller device in other configurations while remaining within the scope of the present disclosure as well.

In an embodiment, the chassis 202 may house a storage device (not illustrated, but which may include the storage device 108 discussed above with reference to FIG. 1) that is coupled to the system controller device 208 and that may include a system controller database 210 that is configured to store any of the information utilized by the system controller device 208 as discussed below. In the illustrated embodiment, the chassis 202 also includes a power button 212 that may be provided by a physical power button known in that art, and that may include power button indicators (e.g., Light Emitting Devices (LEDs), etc.) and/or other physical power button features that would be apparent to one of skill in the art in possession of the present disclosure. As will be appreciated by one of skill in the art in possession of the present disclosure, the system controller device 208 may be coupled to the power button 212 by one or more control channels 213 (e.g., the power button actuation reporting channel and the LED control channel discussed below) while remaining within the scope of the present disclosure as well. However, while the examples of the computing device remote-control system provided below describe remote-control of power functionality that is also provided by the power button 212, one of skill in the art in possession of the present disclosure will appreciate that that the remote control described herein may be utilized with other control functionality in the computing device 200 while remaining within the scope of the present disclosure as well.

As illustrated in FIG. 2, one or more input devices 214 may be provided with the computing device 214, and in the examples below may include keyboard devices, mouse devices, "universal remote controllers", and/or other input devices known in the art. However, while a few specific examples of specific input devices are described, one of skill in the art in possession of the present disclosure will recognize that a variety of input devices may be provided with the computing device 200 while remaining within the scope of the present disclosure as well. Furthermore, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
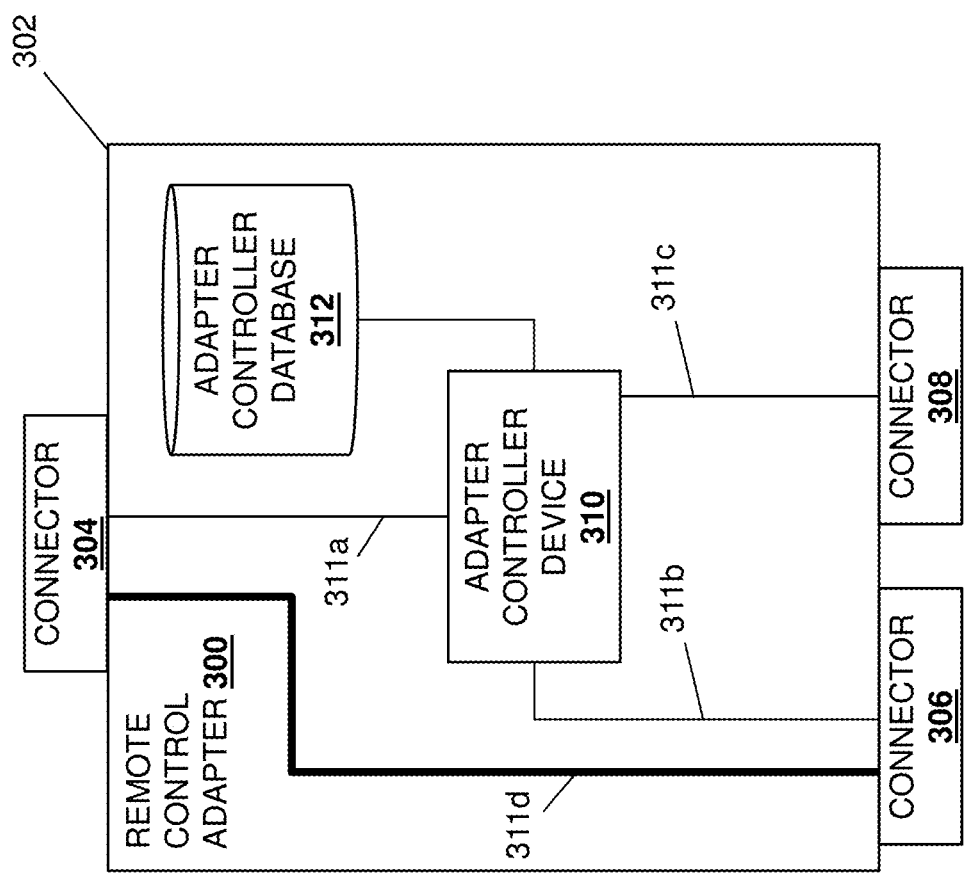
FIG. 3 is a schematic view illustrating an embodiment of a remote-control adapter that may be utilized with the computing device of FIG. 2.

Referring now to FIG. 3, an embodiment of a remote-control adapter 300 is illustrated that may operate to provide the computing device remote control system of the present disclosure. In an embodiment, the remote-control adapter 300 may be provided by the IHS 100 discussed above with reference to FIG. 1 and/or may include some or all of the components of the IHS 100, and in the specific examples below is described as being provided by a wired "dongle" device that is configured to connect with a connector on a desktop computing device or a server computing device. However, while illustrated and discussed as being provided by a wired "dongle" device, one of skill in the art in possession of the present disclosure will recognize that the computing device remote control functionality discussed below may be provided using other devices that are configured to operate similarly as remote-control adapter 300 discussed below. In the illustrated embodiment, the remote-control adapter 300 includes a chassis 302 that houses the components of the remote-control adapter 300, only some of which are illustrated and discussed below.

In the illustrated embodiment, the chassis 302 includes a plurality of connectors 304, 306, and 308. In the specific examples discussed below, the connector 304 is provided by a USB Type-C connector (e.g., a USB Type-C male connecter in the examples below), the connector 306 is provided by a USB Type-C connector (e.g., a USB Type-C female connecter in the examples below), and the connector 308 is provided by a General Purpose Input/Output (GPIO) connector (e.g., a two-pin GPIO power button connector in the examples below), although one of skill in the art in possession of the present disclosure will appreciate that other connectors will fall within the scope of the present disclosure as well.

In the illustrated embodiment, the chassis 302 also houses an adapter controller device 310 that may include an adapter controller processing system (not illustrated, but which may include the processor 102 discussed above with reference to FIG. 1) and an adapter controller memory system (not illustrated, but which may include the memory 114 discussed above with reference to FIG. 1) that is coupled to the adapter controller processing system and that includes instructions that, when executed by the adapter controller processing system, cause the adapter controller processing system to provide an adapter controller engine that is configured to perform the functionality of the adapter controller engines and/or adapter controller devices discussed below.

As illustrated, the adapter controller device 310 may be coupled to the connector 304, the connector 306, and the connector 308. In a specific example, the adapter controller device 310 may be provided by a Power Delivery (PD) controller that is coupled to the connector 304 provided by a USB Type-C connector (e.g., a USB Type-C male connecter in the examples below) via a controller channel 311a such as the USB CC line discussed below, that is coupled to the connector 306 provided by a USB Type-C connector (e.g., a USB Type-C female connecter in the examples below) via a controller channel 311b such as the USB CC line discussed below, and that is coupled to the connector 308 provided by a GPIO connector (e.g., a two-pin GPIO power button connector in the examples below) via a controller channel 311c such as the GPIO line discussed below.

Furthermore, the connector 304 may be coupled to the connector 306 via one or more passthrough channels 311d (e.g., a power line, high speed data lines, etc.) that allow the remote-control adapter 300 to provide passthrough functionality by, for example, connecting the connector 304 to the computing device 200, connecting a device to the connector 306, and transmitting power and high speed data signals via the passthrough channels 311d, while transmitting control signals via the controller channel 311b. As such, in the embodiment illustrated in FIG. 3, the adapter controller device 310 may be configured to receive control signals via the control channel 311a, and determine whether those control signals should be transmitted via the control channel 311b to the device connected to the connector 306, or via the control channel 311c to the device connected to the connector 308. However, in other embodiments separate control channels between the connector 304 and each of the connector 306 and the adapter controller device 310 will fall within the scope of the present disclosure as well.

In the illustrated embodiment, the chassis 302 may house a storage device (not illustrated, but which may include the storage device 108 discussed above with reference to FIG. 1) that is coupled to the adapter controller device 310 and that may include an adapter controller database 312 that is configured to store any of the information utilized by the adapter controller device 310 as discussed below. However, while a specific remote control adapter has been illustrated, one of skill in the art in possession of the present disclosure will recognize that remote control adapters (or other devices operating according to the teachings of the present disclosure in a manner similar to that described below for the remote control adapter 300) may include a variety of components and/or component configurations for providing conventional remote control functionality, as well as the functionality discussed below, while remaining within the scope of the present disclosure as well.

Figure 4:
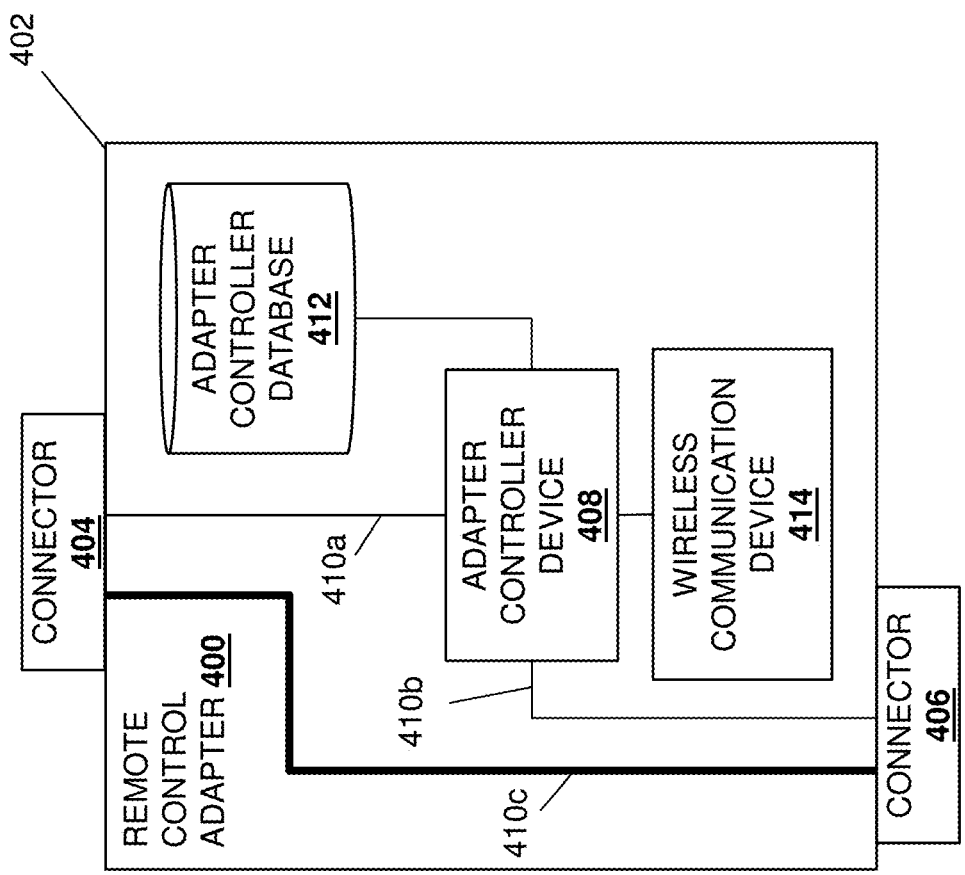
FIG. 4 is a schematic view illustrating an embodiment of a remote-control adapter that may be utilized with the computing device of FIG. 2.

Referring now to FIG. 4, an embodiment of a remote-control adapter 300 is illustrated that may operate to provide the computing device remote control system of the present disclosure. In an embodiment, the remote-control adapter 400 may be provided by the IHS 100 discussed above with reference to FIG. 1 and/or may include some or all of the components of the IHS 100, and in the specific examples below is described as being provided by a wireless "dongle" device that is configured to connect with a connector on a desktop computing device or a server computing device. However, while illustrated and discussed as being provided by a wireless "dongle" device, one of skill in the art in possession of the present disclosure will recognize that the computing device remote control functionality of the discussed below may be may be provided using other devices that are configured to operate similarly as remote-control adapter 400 discussed below. In the illustrated embodiment, the remote-control adapter 400 includes a chassis 402 that houses the components of the remote-control adapter 400, only some of which are illustrated and discussed below.

In the illustrated embodiment, the chassis 402 includes a plurality of connectors 404 and 406. In the specific examples discussed below, the connector 404 is provided by a USB Type-C connector (e.g., a USB Type-C male connecter in the examples below), and the connector 406 is provided by a USB Type-C connector (e.g., a USB Type-C female connecter in the examples below), although one of skill in the art in possession of the present disclosure will appreciate that other connectors will fall within the scope of the present disclosure as well.

In the illustrated embodiment, the chassis 402 also houses an adapter controller device 408 that may include an adapter controller processing system (not illustrated, but which may include the processor 102 discussed above with reference to FIG. 1) and an adapter controller memory system (not illustrated, but which may include the memory 114 discussed above with reference to FIG. 1) that is coupled to the adapter controller processing system and that includes instructions that, when executed by the adapter controller processing system, cause the adapter controller processing system to provide an adapter controller engine that is configured to perform the functionality of the adapter controller engines and/or adapter controller devices discussed below.

As illustrated, the adapter controller device 408 may be coupled to the connector 404 and the connector 406. In a specific example, the adapter controller device 408 may be provided by a Power Delivery (PD) controller that is coupled to the connector 404 provided by a USB Type-C connector (e.g., a USB Type-C male connecter in the examples below) via a controller channel 410a such as the USB CC line discussed below, and that is coupled to the connector 406 provided by a USB Type-C connector (e.g., a USB Type-C female connecter in the examples below) via a controller channel 410b such as the USB CC line discussed below.

Furthermore, the connector 404 may be coupled to the connector 406 via one or more passthrough channels 410c (e.g., a power line, high speed data lines, etc.) that allow the remote-control adapter 400 to provide passthrough functionality by, for example, connecting the connector 404 to the computing device 200, connecting a device to the connector 406, and transmitting power and high speed data signals via the passthrough channels 410c, while transmitting control signals via the controller channel 410b. As such, in the embodiment illustrated in FIG. 4, the adapter controller device 408 may be configured to receive control signals via the control channel 410a, and determine whether those control signals should be transmitted via the control channel 410b to the device connected to the connector 406, or via the wireless communication device 414 that is coupled to the adapter controller device 408 as discussed below. However, in other embodiments separate control channels between the connector 404 and each of the connector 406 and the adapter controller device 408 will fall within the scope of the present disclosure as well.

In the illustrated embodiment, the chassis 402 may house a storage device (not illustrated, but which may include the storage device 108 discussed above with reference to FIG. 1) that is coupled to the adapter controller device 408 and that may include an adapter controller database 412 that is configured to store any of the information utilized by the adapter controller device 410 as discussed below. As discussed above, the chassis 402 may also house a wireless communication device 414 that is coupled to the adapter controller device 408 and that may be provided by a BLUETOOTH® wireless communication device, a WIFI wireless communication device, and/or any other wireless communication device that would be apparent to one of skill in the art in possession of the present disclosure. However, while a specific remote control adapter has been illustrated, one of skill in the art in possession of the present disclosure will recognize that remote control adapters (or other devices operating according to the teachings of the present disclosure in a manner similar to that described below for the remote control adapter 400) may include a variety of components and/or component configurations for providing conventional remote control functionality, as well as the functionality discussed below, while remaining within the scope of the present disclosure as well.

Figure 5:
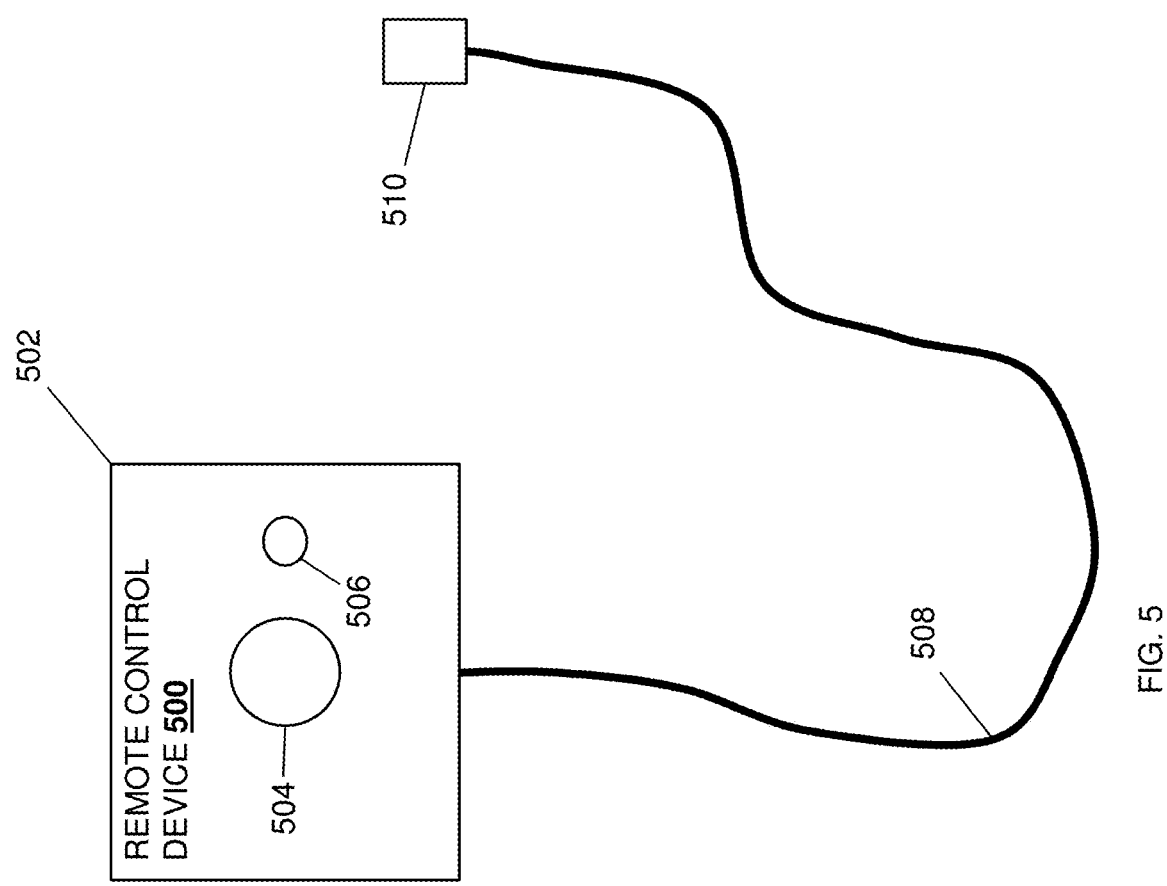
FIG. 5 is a schematic view illustrating an embodiment of a remote-control device that may be utilized with the computing device of FIG. 2 and the remote-control adapter of FIG. 3.

Referring now to FIG. 5, an embodiment of a remote-control device 500 that may be utilized with the remote-control adapter 300 of FIG. 3 is illustrated. In the specific examples illustrated and discussed below, the remote-control device 500 provides a wired remote power control button for use in controlling power states of the computing device 200 discussed above with reference to FIG. 2. In the illustrated embodiment, the remote-control device 500 includes a chassis 502 that houses the components of the remote-control device 500, only some of which are illustrated in FIG. 5. For example, the remote-control device 500 providing the wired remote power control button in the illustrated embodiment includes a remote-control actuator 504 that provides a power button, and a remote-control indicator 506 that provides a power indicator. However, one of skill in the art in possession of the present disclosure will appreciate that the remote-control device 500 may include other features to provide other control functionality while remaining within the scope of the present disclosure as well.

In the illustrated embodiment, a cable 508 extends from the chassis 502 and includes a connector 510 on its distal end, and one of skill in the art in possession of the present disclosure will recognize that the chassis 502 and cable 508 may provide connections that enable the remote-control actuator 504 and remote-control indicator 506 to exchange communications via the connector 510. In a specific example, the connector 510 may be provided by a GPIO connector (e.g., a two-pin GPIO power button connector in the examples below), and the cable 508 may be provided by a two-wire cable, although other cabling and connectors will fall within the scope of the present disclosure as well. However, while a specific wired remote-control device has been illustrated, one of skill in the art in possession of the present disclosure will recognize that wired remote control devices (or other devices operating according to the teachings of the present disclosure in a manner similar to that described below for the remote-control device 500) may include a variety of components and/or component configurations for providing conventional remote-control functionality, as well as the functionality discussed below, while remaining within the scope of the present disclosure as well.

Figure 6:
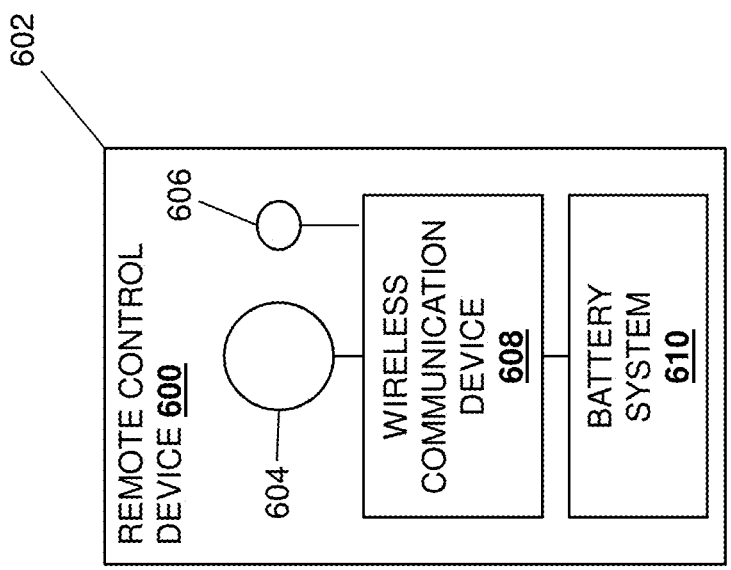
FIG. 6 is a schematic view illustrating an embodiment of a remote-control device that may be utilized with the computing device of FIG. 2 and the remote-control adapter of FIG. 4.

Referring now to FIG. 6, an embodiment of a remote-control device 600 that may be utilized with the remote-control adapter 400 of FIG. 4 is illustrated. In the specific examples illustrated and discussed below, the remote-control device 600 provides a wireless remote power control button for use in controlling power states of the computing device 200 discussed above with reference to FIG. 2. In the illustrated embodiment, the remote-control device 600 includes a chassis 602 that houses the components of the remote-control device 600, only some of which are illustrated in FIG. 6. For example, the remote-control device 600 providing the wireless remote power control button in the illustrated embodiment includes a remote-control actuator 604 that provides a power button, and a remote-control indicator 606 that provides a power indicator. However, one of skill in the art in possession of the present disclosure will appreciate that the remote-control device 600 may include other features to provide other control functionality while remaining within the scope of the present disclosure as well.

In the illustrated embodiment, the chassis 602 houses a wireless communication device 608 that is coupled to the remote-control actuator 604 and the remote-control indicator 606, and that may be provided by a BLUETOOTH® wireless communication device, a WIFI wireless communication device, and/or any other wireless communication device that would be apparent to one of skill in the art in possession of the present disclosure. Furthermore, the chassis 602 also houses a battery system 610 that is coupled to the wireless communication device 608 and that may include a coin-cell battery system and/or other battery components that would be apparent to one of skill in the art in possession of the present disclosure. However, while a specific wireless remote-control device has been illustrated, one of skill in the art in possession of the present disclosure will recognize that wireless remote control devices (or other devices operating according to the teachings of the present disclosure in a manner similar to that described below for the remote-control device 600) may include a variety of components and/or component configurations for providing conventional remote-control functionality, as well as the functionality discussed below, while remaining within the scope of the present disclosure as well.

Figure 7:
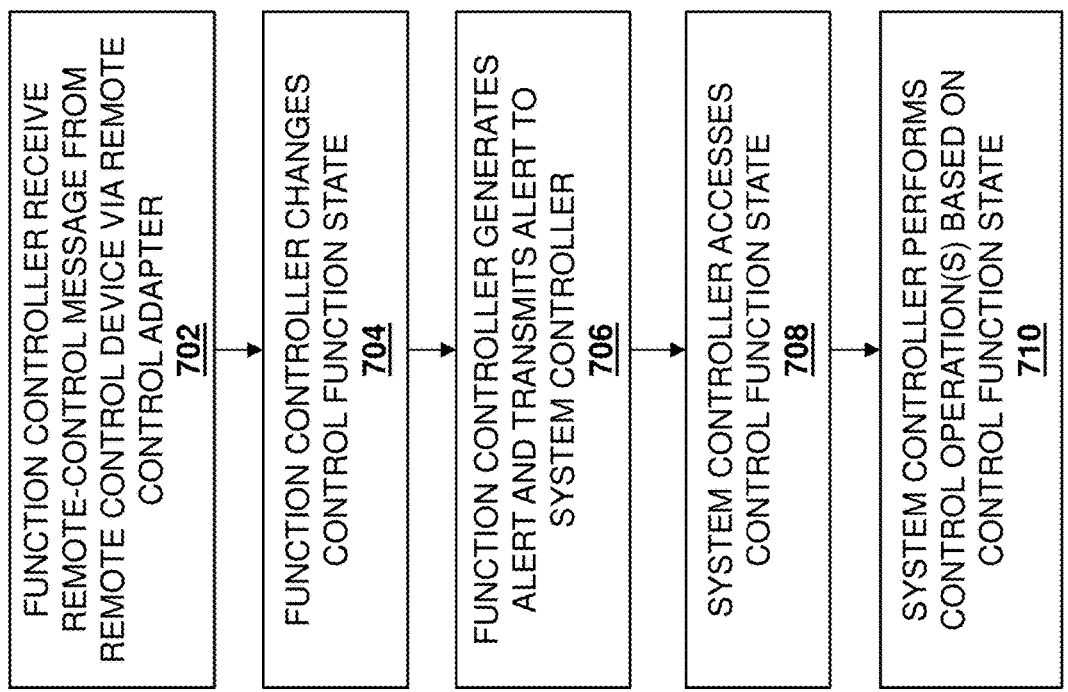
FIG. 7 is a flow chart illustrating an embodiment of a method for remotely controlling a computing device.

Referring now to FIG. 7, an embodiment of a method 700 for remotely controlling a computing device is illustrated. As discussed below, the systems and methods of the present disclosure provide for the connection of a remote-control adapter to a computing device via a commonly available connector such as a USB Type C connector, and leverages a messaging technique that may be used with that commonly available connector in order to allow a remote-control device to be utilized to control the computing device, and that is described in U.S. patent application Ser. No. 16/775,522, filed on Jan. 29, 2020, the disclosure of which is incorporated by reference herein in its entirety. As described in that application, the remote-control device may be communicatively coupled to the remote-control adapter via a wired or wireless communication channel, and the computing device may include a Universal Serial Bus (USB) connector that is connected to the remote-control adapter. A function controller in the computing device may receive a remote-control message from the remote-control device via the computing device USB connector and the remote-control adapter and, in response, change a control function state stored in the function controller, and generate and transmit an alert. A system controller in the computing device may then receive the alert from the function controller and, in response, access the function controller to identify the control function state stored in the function controller, and perform at least one control operation based on the control function state. As such, remote-control functionality may be provided for computing device without the need for multiple dedicated remote-control connectors.

Figure 8:
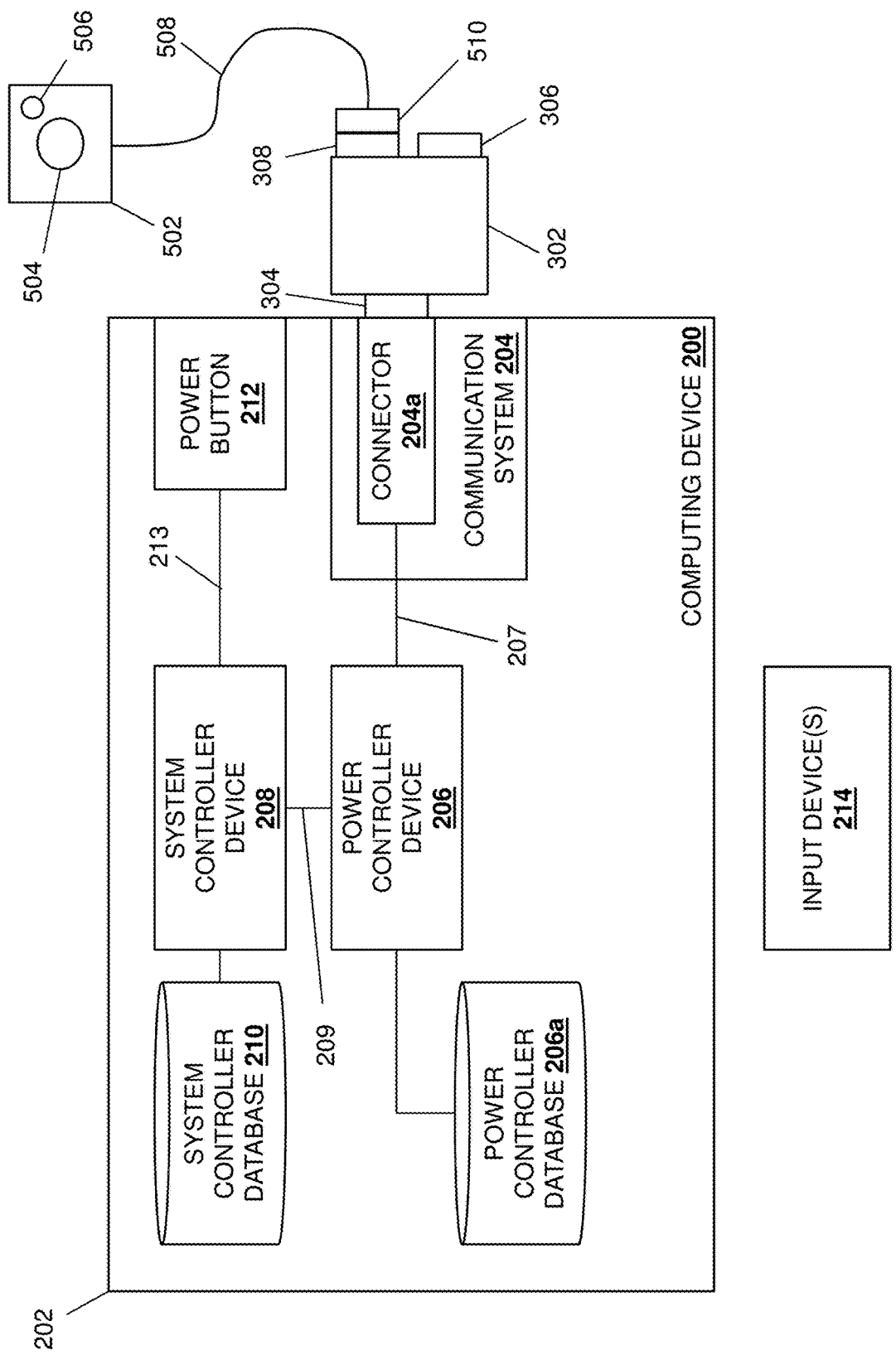
FIG. 8 is a schematic view illustrating an embodiment of the remote-control device of FIG. 5 coupled to the computing device of FIG. 2 using the remote-control adapter of FIG. 3 to provide the computing device remote control system of the present disclosure.

In an embodiment, prior to or during the method 700, the computing device remote control system of the present disclosure may be configured by connecting the remote-control device to the computing device via the remote-control adapter. FIG. 8 illustrates an embodiment of a "wired" computing device remote control system provided by connecting the remote-control adapter 300 to the computing device 200, and communicatively coupling the remote-control device 500 to the remote-control adapter 300. For example, the remote-control adapter 300 may be connected to the computing device 200 by engaging the connector 304 (e.g., a USB Type-C male connector) with the connector 204a (e.g., a USB Type-C female connector), and the remote-control device 500 may be communicatively coupled to the remote-control adapter 300 via connection of the connector 510 (e.g., a GPIO connector) on the cable 508 to the connector 308 (e.g., a GPIO connector) on the remote-control adapter 300. While not illustrated in FIG. 8, one of skill in the art in possession of the present disclosure will appreciate that devices may be connected to the remote-control adapter 300 via, for example, the connection of a USB Type-C male connector on those devices with the connector 306 on the remote-control adapter 300 provided by a USB Type-C female connector. As will be appreciated by one of skill in the art in possession of the present disclosure, the computing device 200 may then be located in a relatively inaccessible location, and the remote-control device 500 may be located in an accessible location in order to allow a user to utilize the remote-control device 500 to control the computing device 200 as discussed below.

Figure 9:
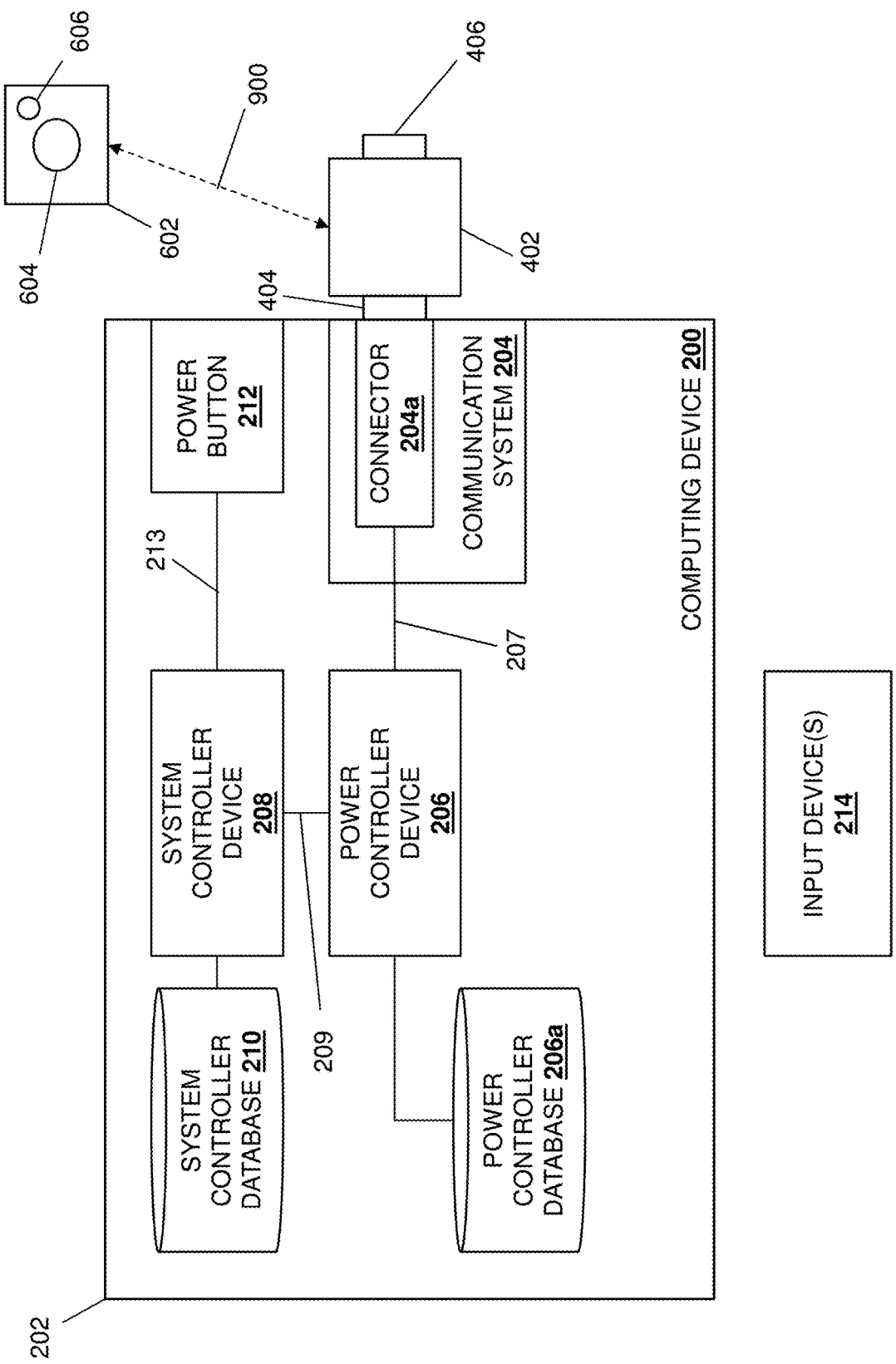
FIG. 9 is a schematic view illustrating an embodiment of the remote-control device of FIG. 6 coupled to the computing device of FIG. 2 using the remote-control adapter of FIG. 4 to provide the computing device remote control system of the present disclosure.

FIG. 9 illustrates an embodiment of a "wireless" computing device remote control system provided by connecting the remote-control adapter 400 to the computing device 200, and communicatively coupling the remote-control device 600 to the remote-control adapter 400. For example, the remote-control adapter 400 may be connected to the computing device 200 by engaging the connector 404 (e.g., a USB Type-C male connector) with the connector 204a (e.g., a USB Type-C female connector), and the remote-control device 600 may be communicatively coupled to the remote-control adapter 400 by establishing a wireless link 900 via the wireless communication device 414 in the remote-control adapter 400 and the wireless communication device 608 in the remote-control device 600. While not illustrated in FIG. 9, one of skill in the art in possession of the present disclosure will appreciate that devices may be connected to the remote-control adapter 400 via, for example, the connection of a USB Type-C male connector on those devices with the connector 406 on the remote-control adapter 400 provided by a USB Type-C female connector. As will be appreciated by one of skill in the art in possession of the present disclosure, the computing device 200 may then be located in a relatively inaccessible location, and the remote-control device 600 may be located in an accessible location in order to allow a user to utilized the remote-control device 600 to control the computing device 200 as discussed below.

In some embodiments, the configuration of the "wireless" computing device remote control system provided by connecting the remote-control adapter 400 to the computing device 200, and communicatively coupling the remote-control device 600 to the remote-control adapter 400, may be followed by the computing device 200 configuring the remote-control adapter 400 to operate in a desired operating mode. For example, the adapter controller device 408 may be configurable in a variety of operating modes that result in the adapter controller device 408 performing differently based on different data received from remote-control device(s). In the examples below, the adapter controller device 408 is configurable in a restricted operating mode in which only limited wireless communications received from remote-control device(s) are transmitted to the computing device 200, and an unrestricted operating mode in which any wireless communications received from remote-control device(s) are transmitted to the computing device 200, but one of skill in the art in possession of the present disclosure will recognize that a variety of configurable operating modes may be available for the remote-control adapter 400 while remaining within the scope of the present disclosure as well.

In a specific example, a user of the "wireless" computing device remote control system may configure the operating mode for the remote-control adapter 400 by identifying the desired operating mode for the remote-control adapter 400 in the system controller database 210 (e.g., by setting an operating mode policy in the system controller database 210). Following the identification of the desired operating mode for the remote-control adapter 400 in the system controller database 210, the system controller device 208 may operate (e.g., following a power-on, reset, reboot, and/or other initialization of the computing device 200) to retrieve the operating mode from the system controller database 210, access the remote-control adapter 400 (e.g., via the power controller device 206), and configure the remote-control adapter 400 to operate in the desired operating mode. In a specific example, the configuration of the remote-control adapter 400 in the desired operating mode may be performed via a Vendor-Defined Message (VDM) transmitted by the system controller device 208 to the remote-control adapter 400.

In an embodiment, the configuration of the remote-control adapter 400 in the desired operating mode may include a user "waking" the remote-control adapter 400 via an input to the remote-control actuator 604 on the remote-control device 600, which may cause the remote-control adapter 400 to transmit a VDM to the system controller device 208 that causes the system controller device 208 to identify the desired operating mode in the system controller database 210, configure itself and the remote-control adapter 400 to operate in the desired operating mode, and enumerate the remote-control adapter 400 to an operating system running in the computing device 200.

As such, the remote adapter device 400 may be configured in an unrestricted mode in which it receives data and, in response, transmits that data to the computing device 200. Furthermore, when configured in a restricted mode, if the remote adapter device 400 receives restricted mode data (e.g., wake function data, manage function data, etc.) it will transmit that restricted mode data to the computing device 200, while if the remote adapter device 400 receives unrestricted mode data it will discard, "drop", and/or otherwise ignore that unrestricted mode data. Further still, the configuration of the system controller device 208 in the desired operating mode defined for the remote-control adapter 400 allows the system controller device 208 to ignore any unrestricted data received from the remote-control adapter 400 when the system controller device 208 is configured to operate in the restricted operating mode.

Figure 10A:
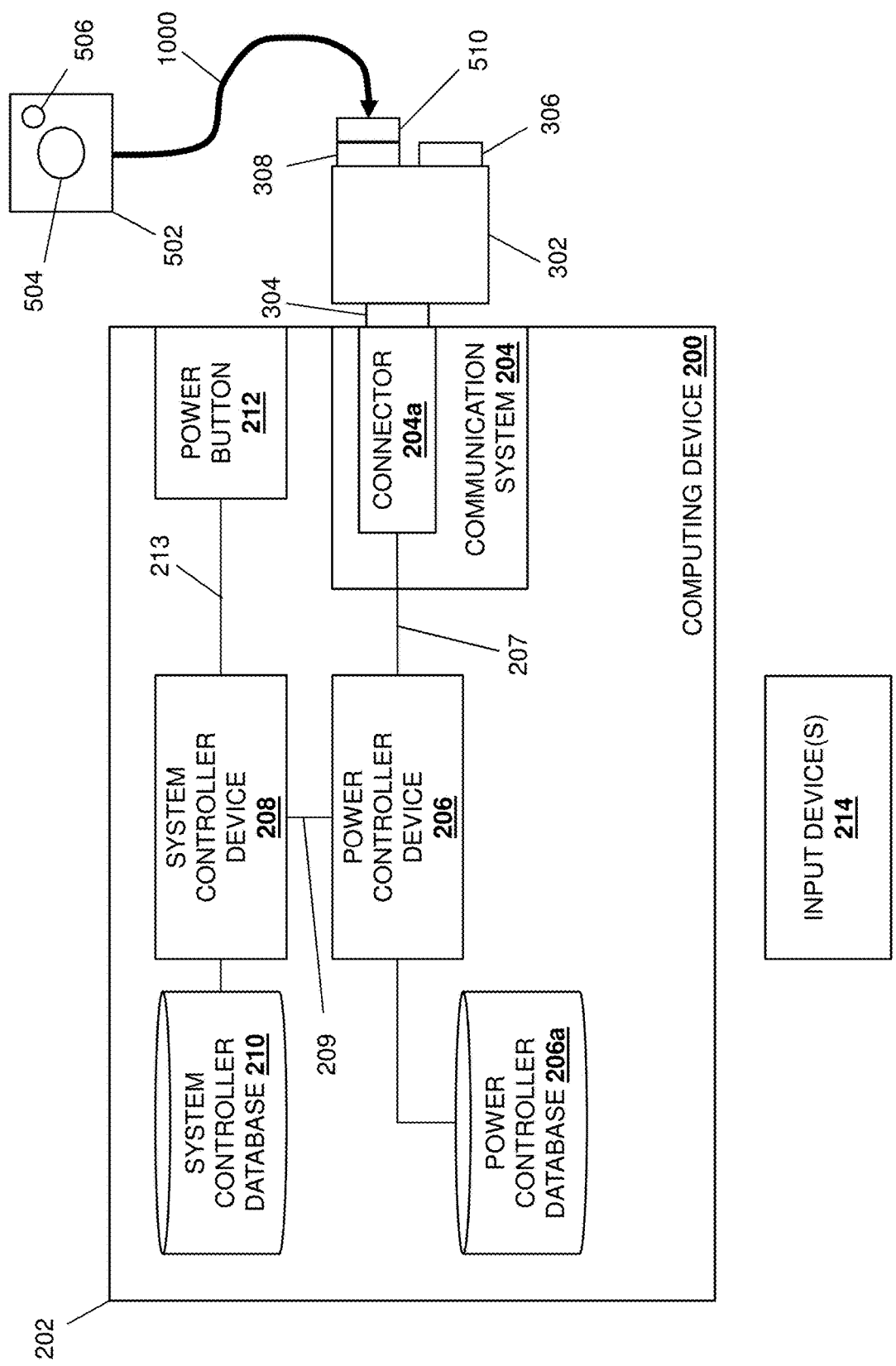
FIG. 10A is a schematic view illustrating an embodiment of the operation of the computing device remote control system of FIG. 8.
Figure 10B:
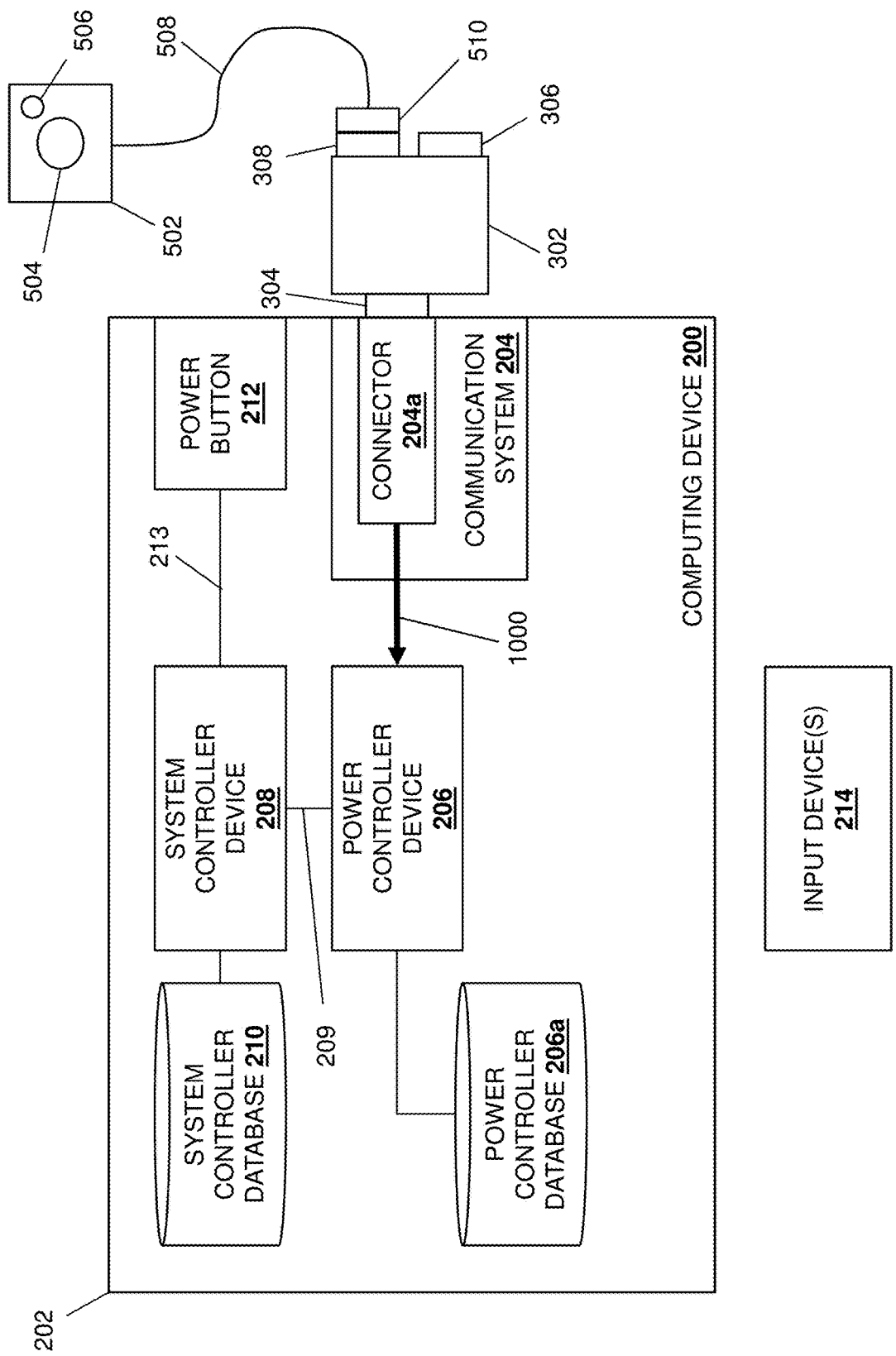
FIG. 10B is a schematic view illustrating an embodiment of the operation of the computing device remote control system of FIG. 8.

The method 700 begins at block 702 where a function controller receives a remote-control message from a remote-control device via a remote-control adapter. With reference to FIG. 10A, in an embodiment of block 702, a user may actuate the remote-control actuator 504 (e.g., by pressing a power button provided by the remote-control actuator 504) in order to cause the remote-control device 500 to generate and transmit a remote-control message 1000 via the cable 508 and to the remote-control adapter 300. With reference to FIG. 10B, in response to receiving the remote-control message 1000, the adapter controller device 310 may transmit that remote-control message 1000 to the power controller device 206.

Figure 11A:
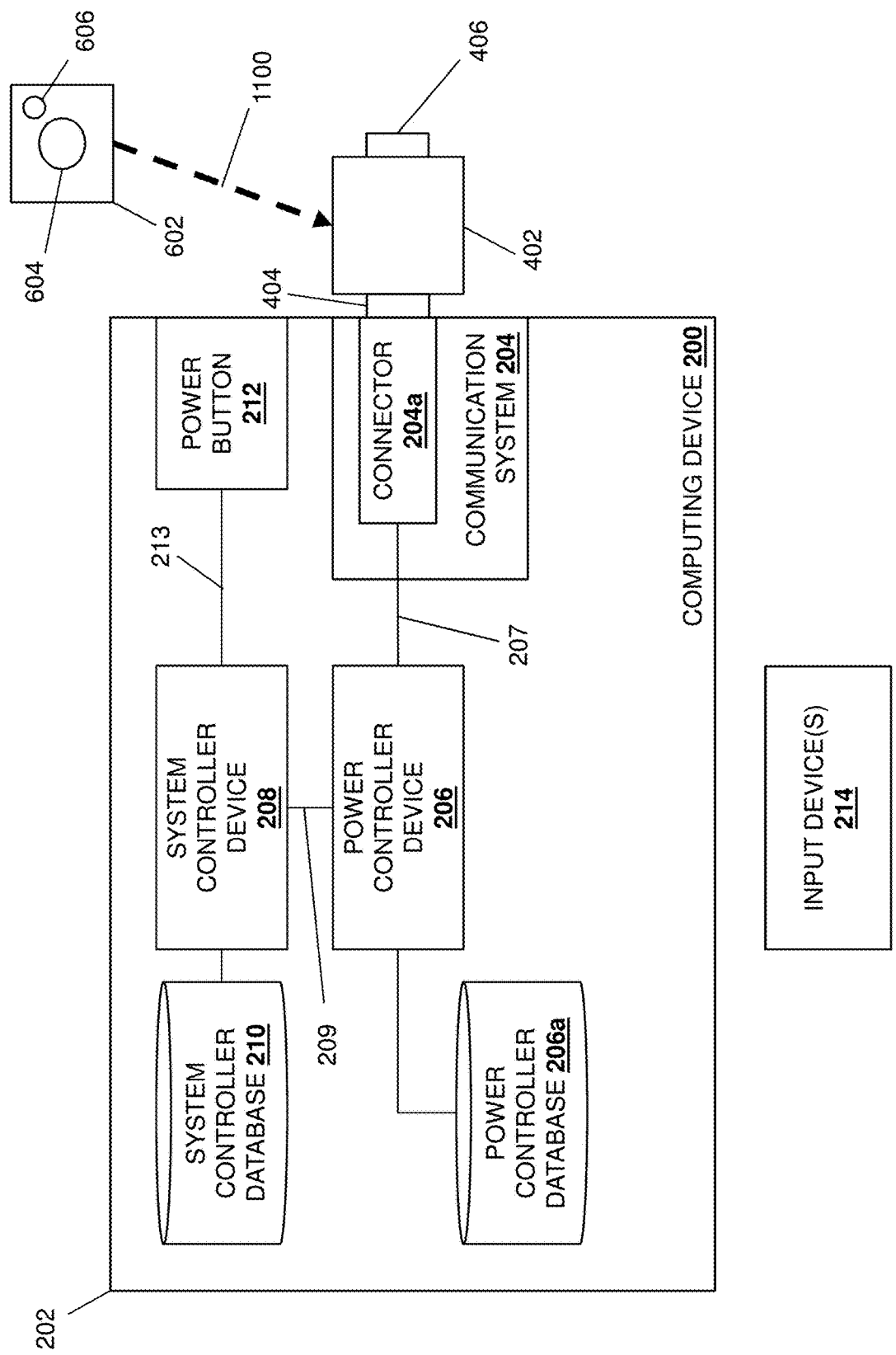
FIG. 11A is a schematic view illustrating an embodiment of the operation of the computing device remote control system of FIG. 9.
Figure 11C:
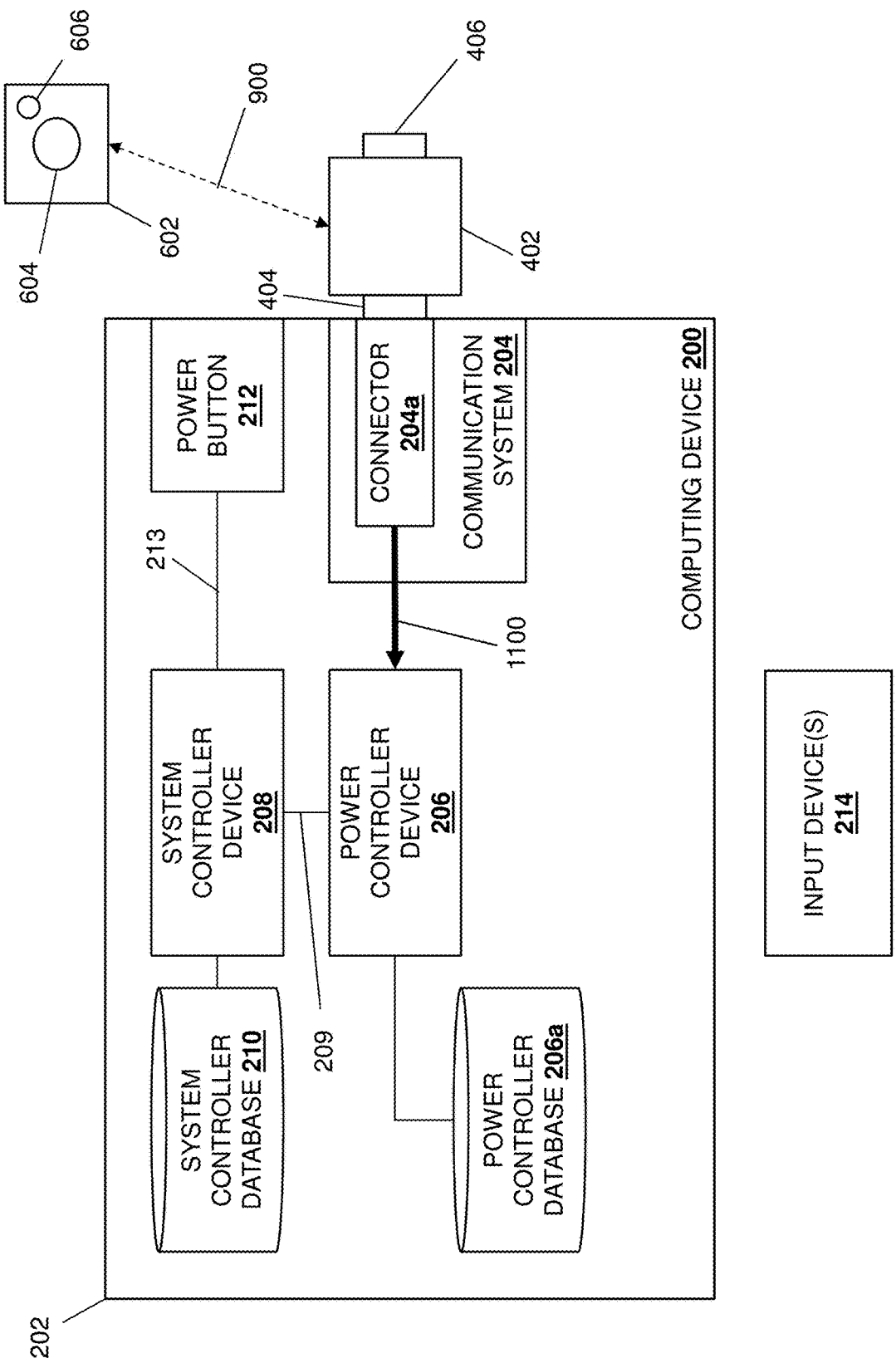
FIG. 11C is a schematic view illustrating an embodiment of the operation of the computing device remote control system of FIG. 9.

With reference to FIG. 11A, in an embodiment of block 702, a user may actuate the remote-control actuator 604 (e.g., by pressing a power button provided by the remote-control actuator 604) in order to cause the remote-control device 600 to generate and transmit a remote-control message 1000 via the wireless link 900 and to the remote-control adapter 400. Furthermore, FIG. 11B illustrates how the remote-control adapter 400 also allows a user to utilize the input device(s) 214 to generate and transmit a remote-control message 1101 (which is substantially similar to the remote-control message 1100 discussed below) via a wireless link (which is substantially similar to the wireless link 900 discussed above) and to the remote-control adapter 400 as well. For example, a user may define a unique key sequence on a keyboard, a unique button sequence on a mouse, and/or other input actions on other input devices that cause the transmission of the remote-control message 1101. With reference to FIG. 11C, in response to receiving the remote-control message 1100, the adapter controller device 408 may transmit that remote-control message 1000 to the power controller device 206.

In some embodiments, the transmission of the remote-control message 1000 by the remote-control device 600 via the wireless link 900 and to the remote-control adapter 400 may be secured. For example, a user may "pair" the remote-control device 600 with the remote-control adapter 400 and/or the computing device 200, and/or otherwise authorize the use of the remote-control device 600 with the remote-control adapter 400 and/or the computing device 200, in order to ensure that only authorized remote-control devices may be utilized to control the computing device 200. In a specific example, this may be accomplished by the user providing some unique input combination on the remote-control device 600 (e.g., pressing and holding a power button provided by the remote-control actuator 604), which may enable authorized remote-control device communications between the system controller device 208 and/or remote-control adapter 400 and the remote-control device 600 that one of skill in the art in possession of the present disclosure will recognize allow the system controller device 208 and/or remote-control adapter 400 to recognize the private key signed messages that are subsequently received from the remote-control device 600 as discussed below.

Thus, following the authorization of the remote-control device 600 for use with the computing device 200, the user may actuate the remote-control actuator 604 to cause the remote-control device 600 to generate the remote-control message 1000, encrypt and sign that remote-control message 1000 using a private key stored in the remote-control device 600, and then transmit that encrypted signed remote-control message 1000 to the system controller device 208 and/or remote-control adapter 400. As such, in some embodiments, upon receiving the encrypted signed remote-control message 1000 from the remote-control device 600 via the wireless link 900 and the wireless communication, the adapter controller device 408 may decrypt the encrypted signed remote-control message 1000, verify that the remote-control device 600 transmitted that remote-control message 1000 using the signature provided in the encrypted signed remote-control message 1000, and identify the control operation included in the remote-control message 1000 (discussed in further detail below).

In other embodiments, upon receiving the encrypted signed remote-control message 1000 from the remote-control device 600 via the wireless link 900 and the wireless communication, the adapter controller device 408 may provide the encrypted signed remote-control message 1000 via the connector 204a and the power controller device 206 to the system controller device 208. As will be appreciate by one of skill in the art in possession of the present disclosure, the system controller device 208 may provide a "root of trust", and thus may operate to verify authorized remote-control devices for the computing device 200. Thus, upon receiving the encrypted signed remote-control message 1000, the system controller device 208 may then decrypt the encrypted signed remote-control message 1000, verify that the remote-control device 600 transmitted that remote-control message 1000 using the signature provided in the encrypted signed remote-control message 1000, and identify the control operation included by the remote-control message 1000 (discussed in further detail below). As such, as will be appreciated one of skill in the art in possession of the present disclosure, the private key signatures discussed above may be utilized to verify remote-control messages have been received by an authorized remote-control device, and in the event a remote-control message cannot be verified as having been received from an authorized remote-control device, that remote-control message will be "dropped" or otherwise ignored by the remote-control adapter 400 or the computing device 200. As such, while a specific example has been provided, one of skill in the art in possession of the present disclosure will appreciate how data in remote transmit may be protected via a variety of encryption techniques that will fall within the scope of the present disclosure.

In the examples below, the user has actuated the remote-control actuator 504/604 by pressing a power button provided by the remote-control actuator 504/604 in order to either power-off the computing device 200 when it is being powered, or to power-on the computing device 200 after it was previously powered down. As such, the remote-control messages 1000 and 1100 illustrated in FIGS. 10A and 11A may be remote power-off or remote power-on messages that identify a power state change. However, while specific power control functionality is described in detail herein, one of skill in the art in possession of the present disclosure will recognize that other control functionality will fall within the scope of the present disclosure as well.

The method 700 then proceeds to block 704 where the function controller changes a control function state. In an embodiment, at block 704 and in response to receiving the remote-control message 1000/1100, the power controller device 206 may operate to change a control function state that is tracked by the power controller device 206. For example, in response to receiving a remote power-off message, the power controller device 206 may operate at block 704 to change a power state stored in a register in the power controller database 206a to a "power-off" state. In another example, in response to receiving a remote power-on message, the power controller device 206 may operate at block 704 to change a power state stored in a register in the power controller database 206a to a "power-on" state. However, while power control states are described herein, one of skill in the art in possession of the present disclosure will recognize that any control function state may be changed at block 704 while remaining within the scope of the present disclosure as well.

Figure 10C:
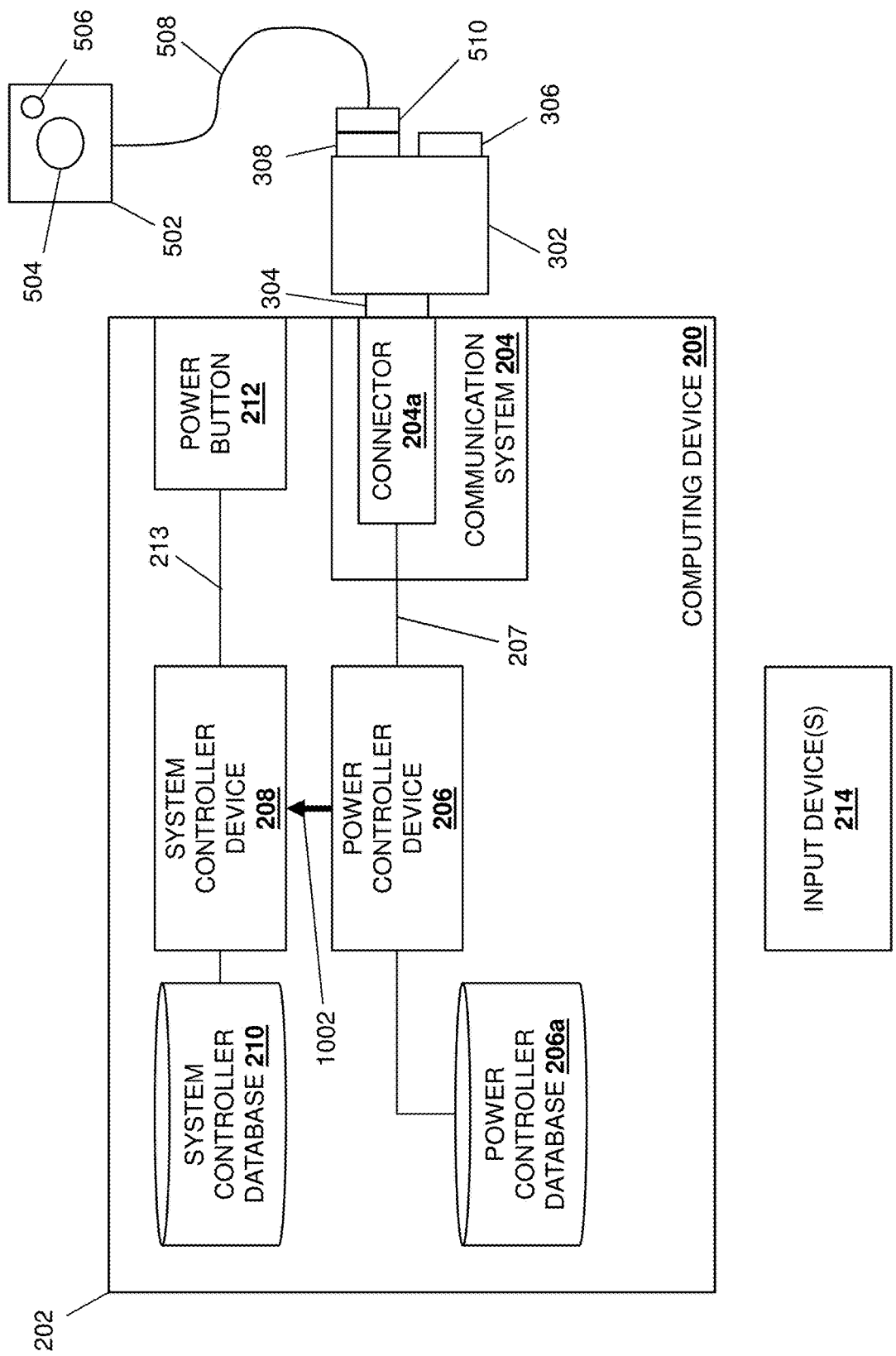
FIG. 10C is a schematic view illustrating an embodiment of the operation of the computing device remote control system of FIG. 8.
Figure 11D:
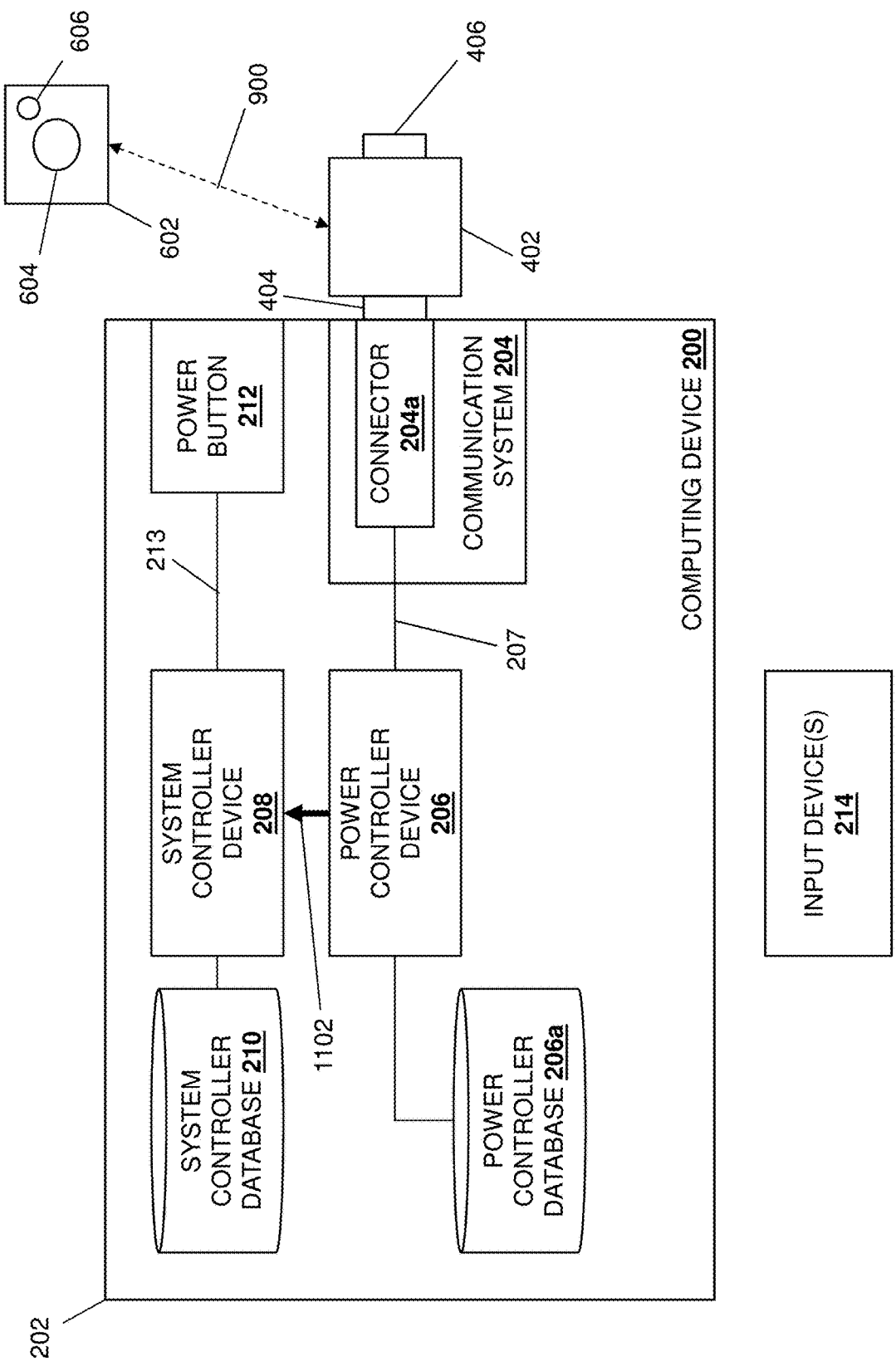
FIG. 11D is a schematic view illustrating an embodiment of the operation of the computing device remote control system of FIG. 9.

The method 700 then proceeds to block 706 where the function controller generates an alert and transmits the alert to a system controller. In an embodiment, at block 706 and following the changing of the control function state at block 704, the power controller device 206 may operate to generate and transmit an alert to the system controller device 208. For example, FIGS. 10C and 11D illustrates how the power controller device 206 may generate and transmit an alert 1002/1102 via the alert communication channels 209 to the system controller device 208 at block 706 following the changing of the power control state at block 704.

Figure 10D:
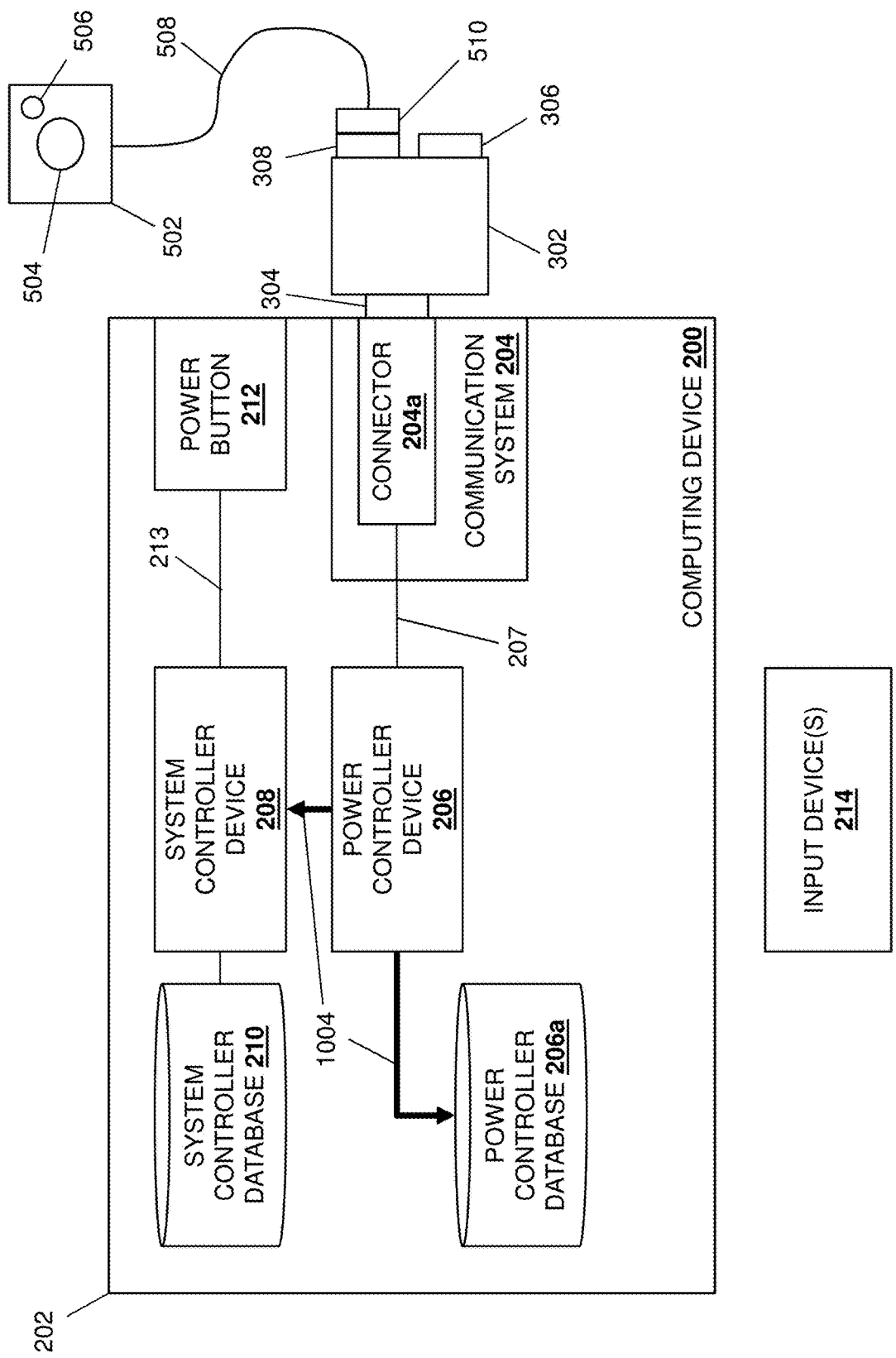
FIG. 10D is a schematic view illustrating an embodiment of the operation of the computing device remote control system of FIG. 8.
Figure 11E:
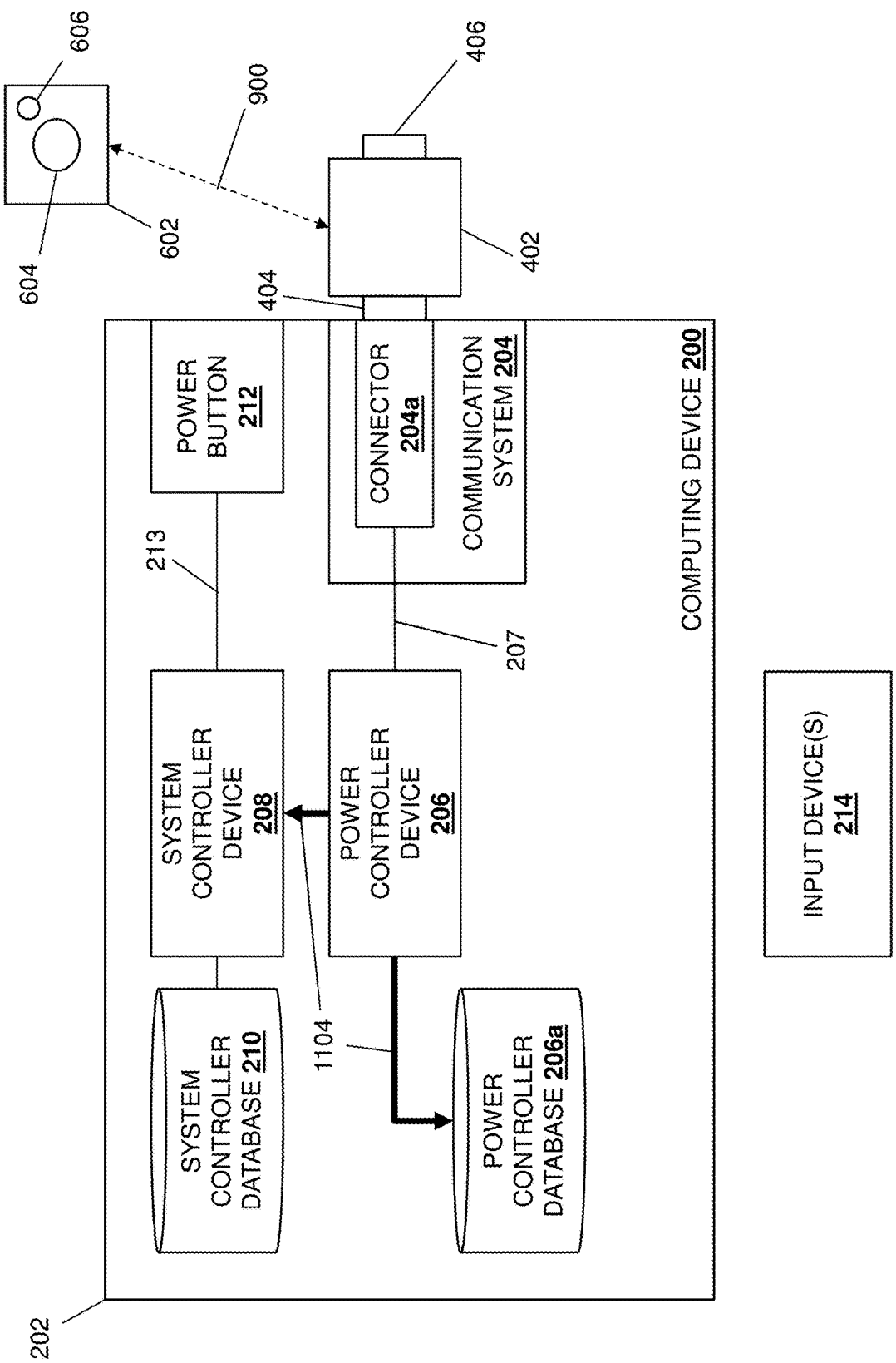
FIG. 11E is a schematic view illustrating an embodiment of the operation of the computing device remote control system of FIG. 9.

The method 700 then proceeds to block 708 where a system controller accesses the control function state. In an embodiment, at block 708 and in response to receiving the alert 1002/1102 at block 706, the system controller device 208 may operate to access the control function state stored in the power controller database 206a. For example, FIGS. 10D and 11E illustrates how the system controller device 208 may perform control function state access operations 1004/1104 via the I$^2$C communication channels 209 to the PD controller device 206 in order to access the control function state that was stored in the power controller database 206a by the power controller device 206 at block 704. As such, at block 708, the system controller device 208 may identify whether the power control state stored on the power controller database 206a was changed from a "power-on" state to a "power-off" state, or identify whether the power control state stored on the power controller database 206a was changed from a "power-off" state to a "power-on" state.

The method 700 then proceeds to block 710 where a system controller performs control operation(s) based on the control function state. In an embodiment, at block 710 and based on the control function state identified at block 708, the system controller device 208 may operate to perform one or more control operations. For example, in response to identifying that the power control state stored on the power controller database 206a was changed from a "power-on" state to a "power-off" state, the system controller device 208 may perform a power control operation that switches the computing device 200 from a "power-on" state to a "power-off" state, and one of skill in the art in possession of the present disclosure will recognize how a system controller device (e.g., a System EC) may have access and control of a power system in the computing device 200 in order to switch the computing device 200 from a "power-on" state to a "power-off" state (and thus power off the computing device 200). In another example, in response to identifying that the power control state stored on the power controller database 206a was changed from a "power-off" state to a "power-on" state, the system controller device 208 may perform a power control operation that switches the computing device 200 from a "power-off" state to a "power-on" state, and one of skill in the art in possession of the present disclosure will recognize how a system controller device (e.g., a System EC) may have access and control of a power system in the computing device 200 in order to switch the computing device 200 from a "power-off" state to a "power-on" state (and thus power on the computing device 200).

Figure 10E:
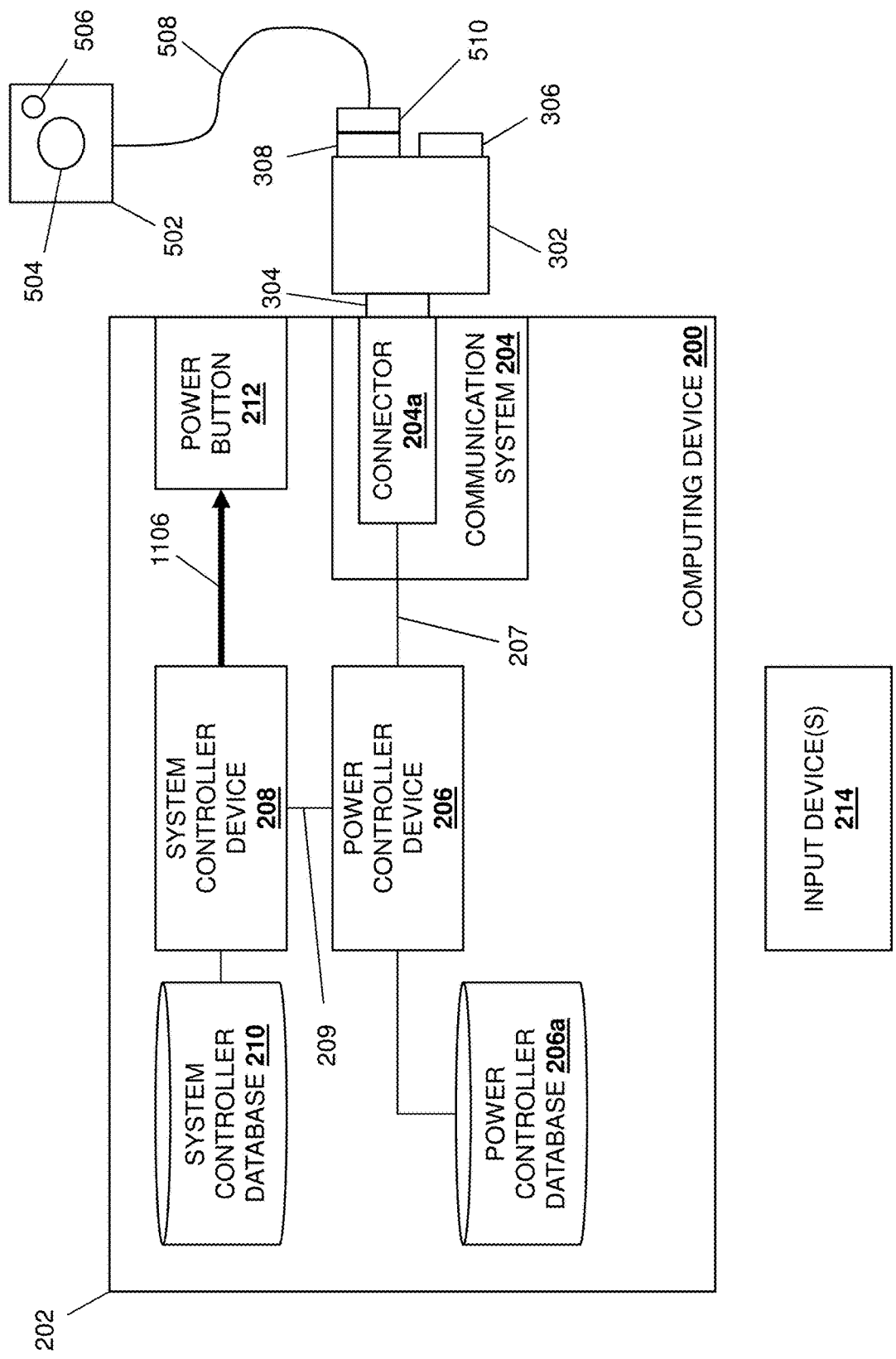
FIG. 10E is a schematic view illustrating an embodiment of the operation of the computing device remote control system of FIG. 8.
Figure 11F:
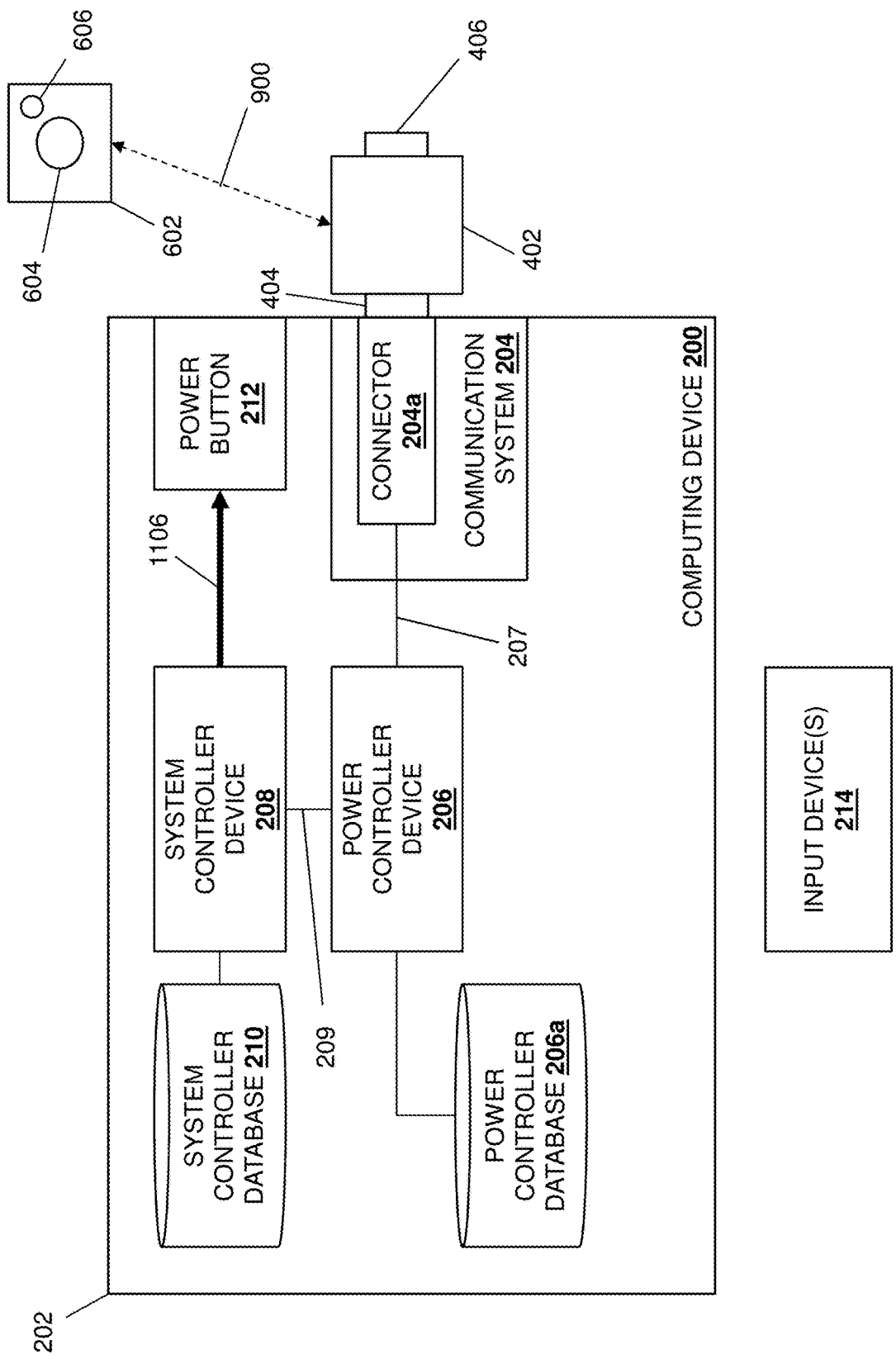
FIG. 11F is a schematic view illustrating an embodiment of the operation of the computing device remote control system of FIG. 9.

With reference to FIGS. 10E and 11F, in some embodiments, the power control operations performed by the system controller device 208 at block 710 may include the system controller device 208 sending a power indicator instruction 1006/1106 via the LED control channel 213 to the power button 212 in order to cause the operation of the LED included on the power button 212 to change. As such, in response to identifying that the power control state stored on the power controller database 206a was changed from a "power-on" state to a "power-off" state, the system controller device 208 may transmit the power indicator instruction 1006/1106 via the LED control channel 213 to the power button 212 in order to cause the LED included on the power button 212 to turn off. Similarly, in response to identifying that the power control state stored on the power controller database 206a was changed from a "power-off" state to a "power-on" state, the system controller device 208, the system controller device 208 may transmit the power indicator instruction 1006/1106 via the LED control channel 213 to the power button 212 in order to cause the LED included on the power button 212 to turn on. Thus, the computing device 200 may be powered-on or powered-off remotely via the connection of the remote-control device 500/600 to the remote-control adapter 300/400 that is connected to a common connector (e.g., a USB Type-C connector).

Figure 12A:
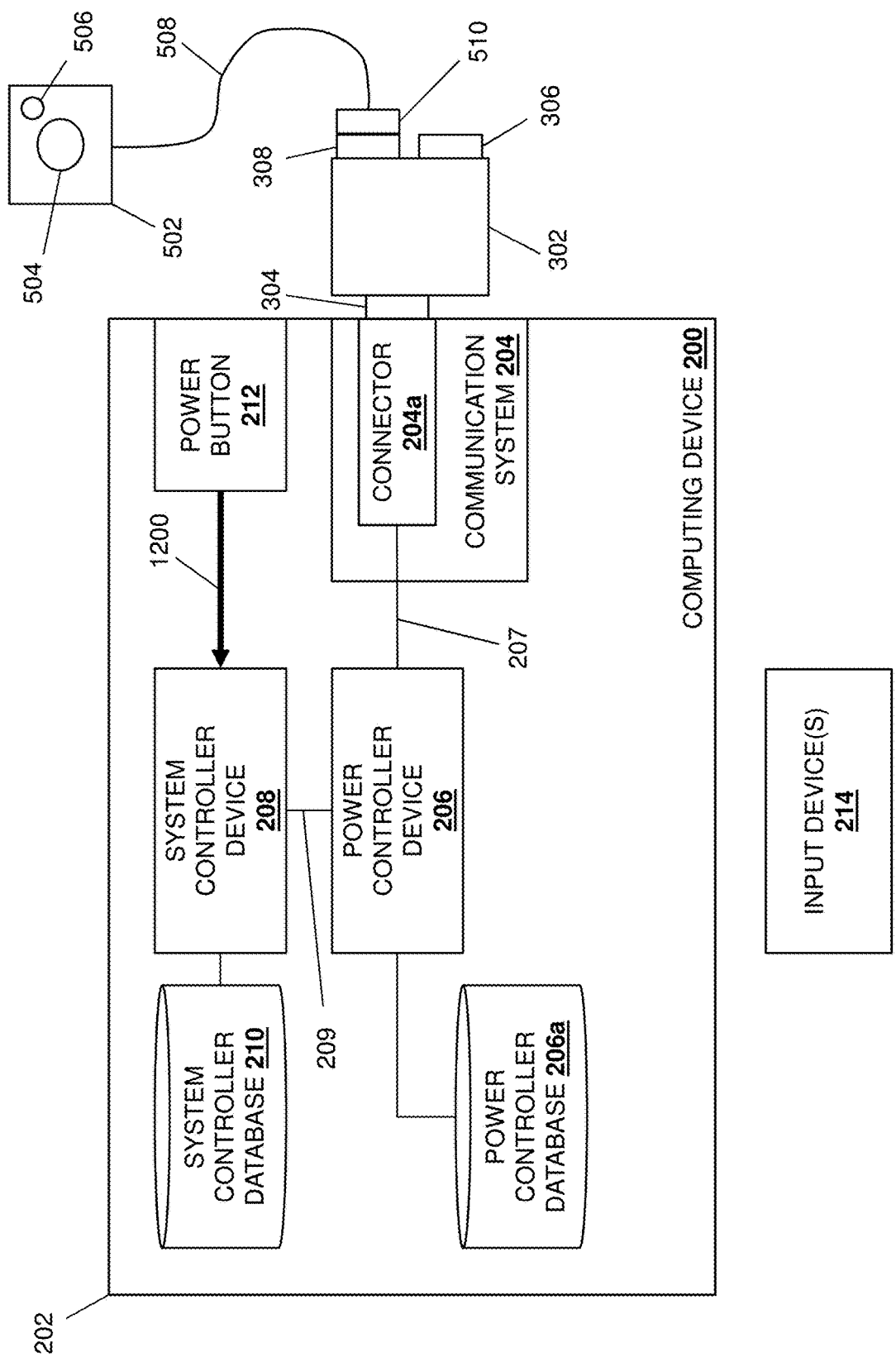
FIG. 12A is a schematic view illustrating an embodiment of the operation of the computing device remote control system of FIG. 8.
Figure 12B:
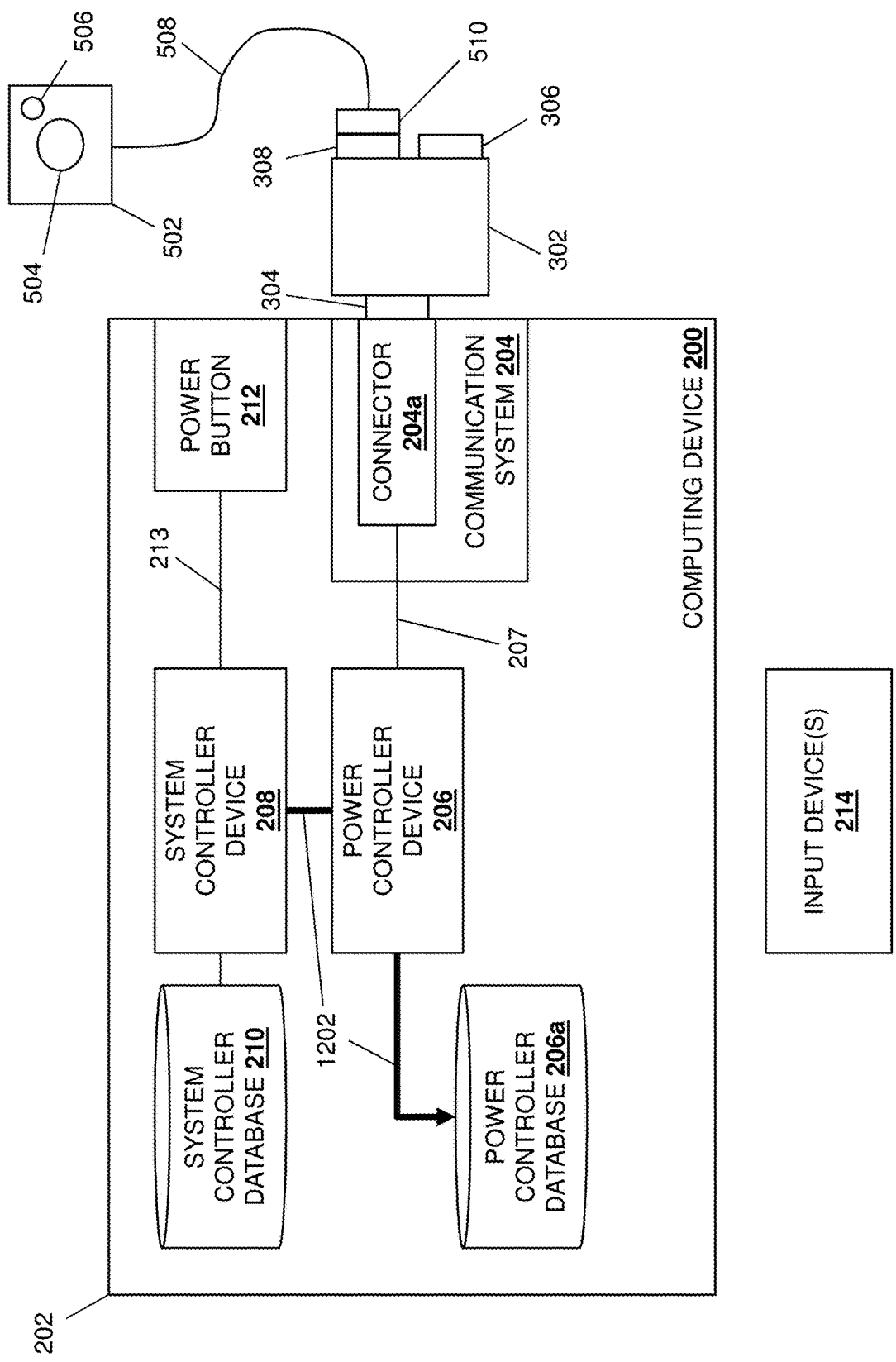
FIG. 12B is a schematic view illustrating an embodiment of the operation of the computing device remote control system of FIG. 8.
Figure 12C:
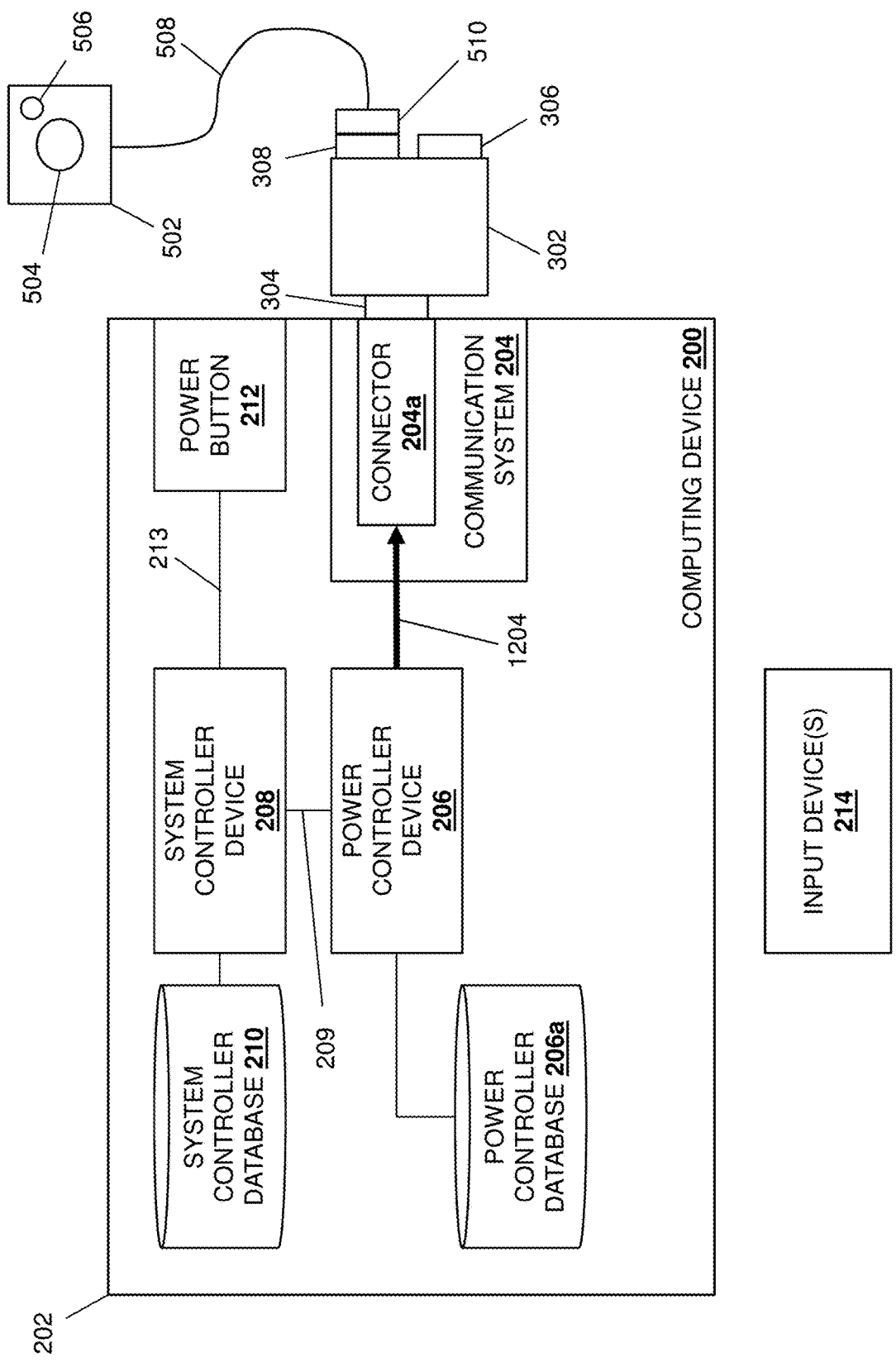
FIG. 12C is a schematic view illustrating an embodiment of the operation of the computing device remote control system of FIG. 8.
Figure 13A:
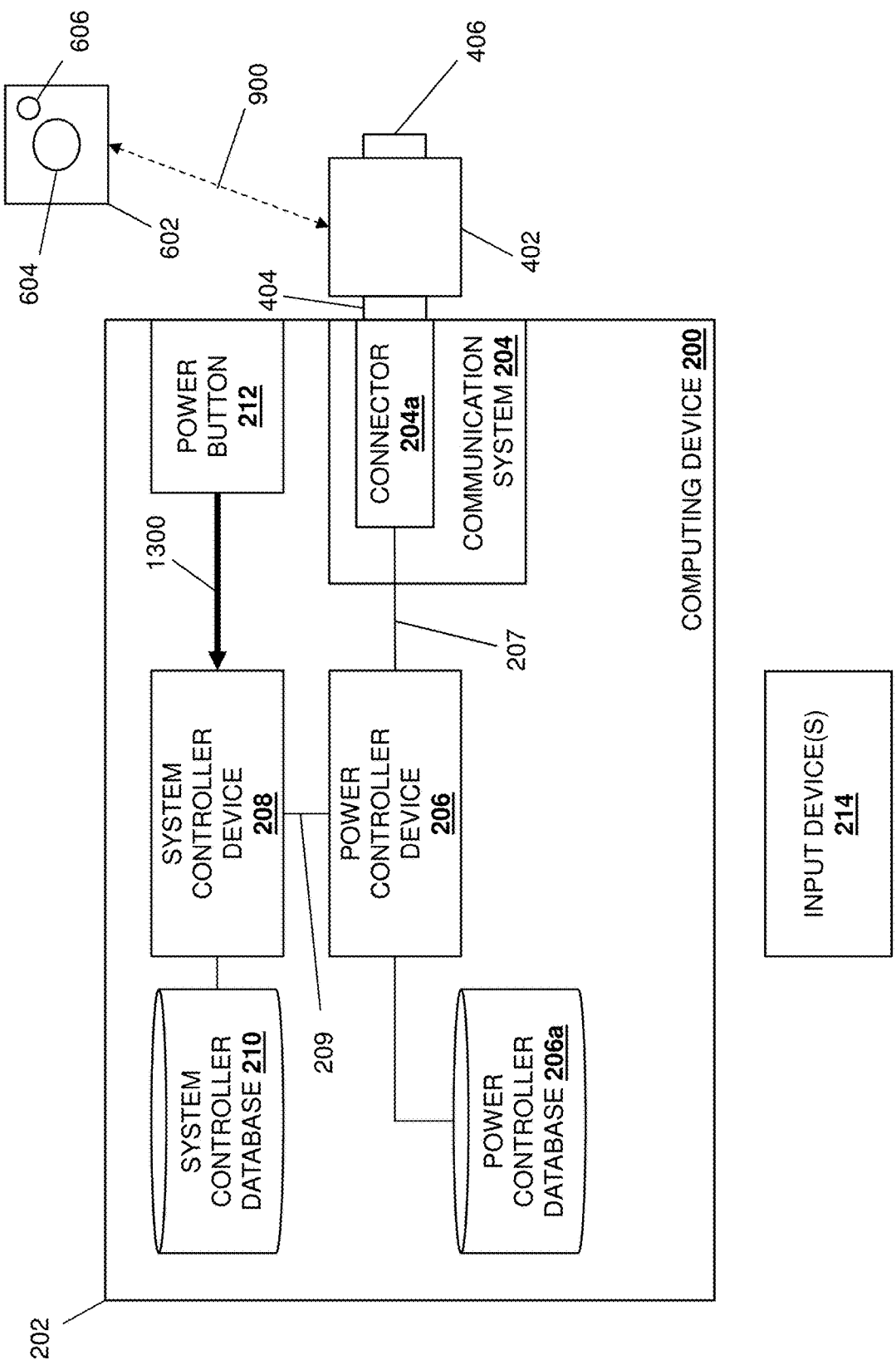
FIG. 13A is a schematic view illustrating an embodiment of the operation of the computing device remote control system of FIG. 9.
Figure 13B:
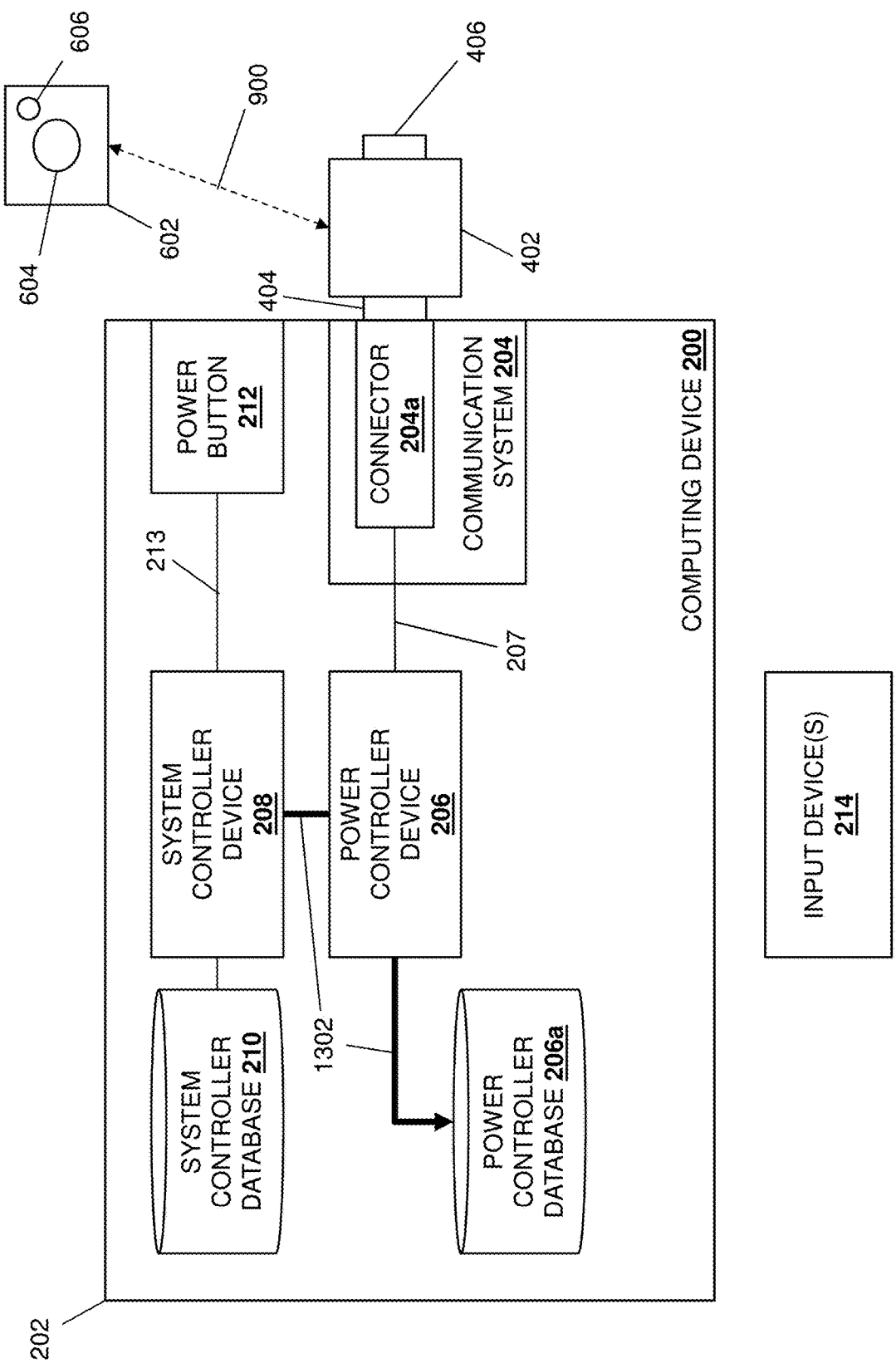
FIG. 13B is a schematic view illustrating an embodiment of the operation of the computing device remote control system of FIG. 9.
Figure 13C:
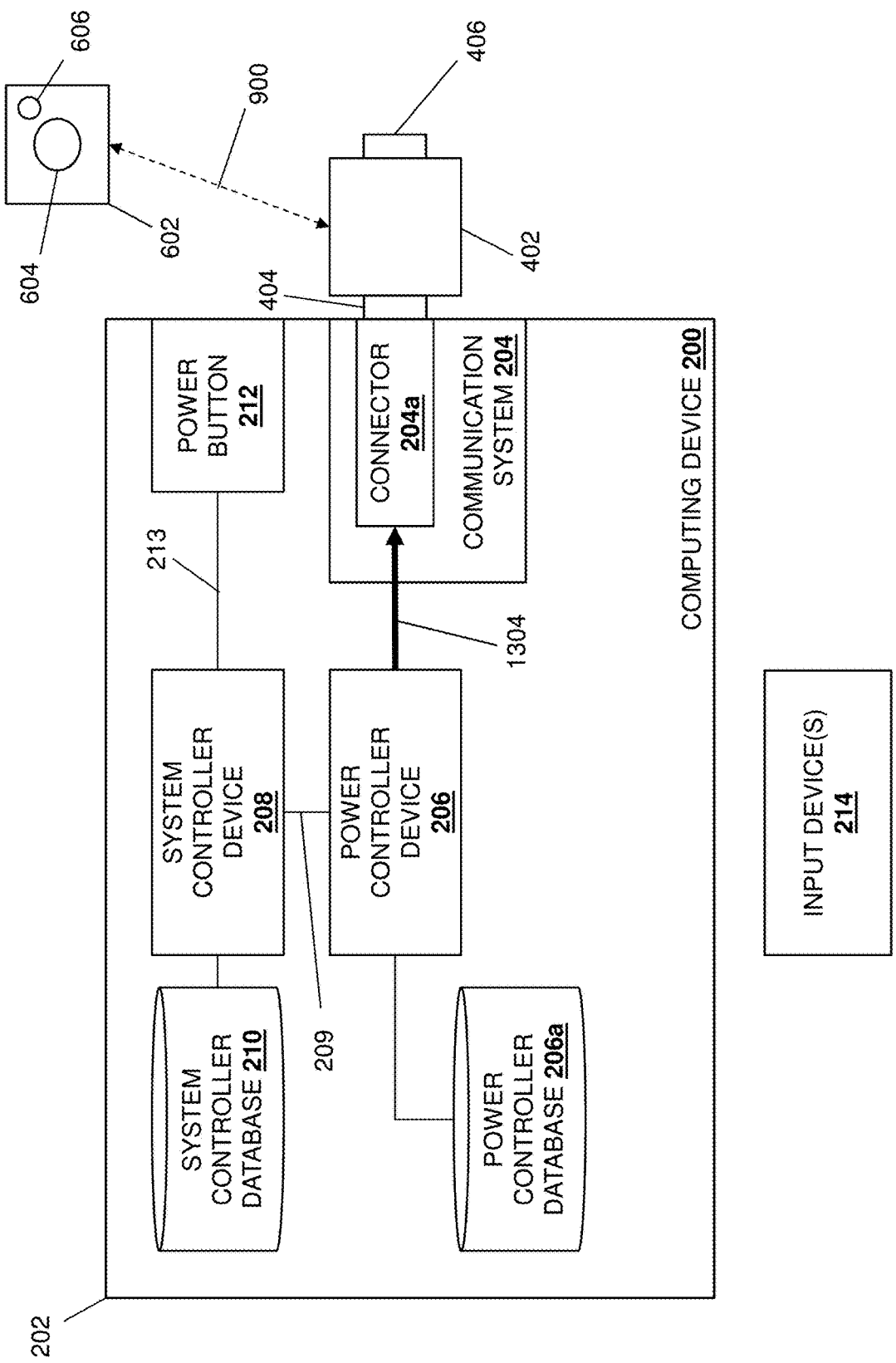
FIG. 13C is a schematic view illustrating an embodiment of the operation of the computing device remote control system of FIG. 9.

In some embodiments, a user may utilize the power button 212 rather than the remote power button provided by the remote-control device 500/600. With reference to FIGS. 12A and 13A, actuation of the power button 212 may cause the power button 212 to generate and transmit a power state change signal 1200/1300 to the system controller device 208 via the power button actuation channel 213. In response to receiving the power state change signal 1200/1300, the system controller device 208 may operate to change a power state tracked by the power controller device 206. For example, FIGS. 12B and 13B illustrate how the system controller device 208 may perform write operations 1202/1302 to write to a register in the power controller database 206a in order to change the power state tracked by that register. In response to detecting the change in the power state stored in the register in the power controller database 206a, the power controller device 206 may operate to inform connected devices of the power state change in the computing device 200. For example, FIGS. 12C and 13C illustrate how the power controller device 206 may transmit a power state change communication 1204/1304 via the connector 204a to the remote-control adapter device 300/400, and one of skill in the art in possession of the present disclosure will appreciate how devices connected to the connectors 306/406 on the remote-control adapter device 300/400 may be informed of the power state change in the computing device 200 via the power state change communication 1204/1304. Furthermore, in some embodiments and upon receiving the power state change communication 1204/1304, the adapter controller device 310/408 in the remote-control adapter device 300/400 may transmit that power state change communication 1204/1304 to the remote-control device 500/600 in order to, for example, change the operation of the remote-control indicator 506/606 (i.e., turn a power state indicator on or off depending on a current power state similarly as discussed above).

Thus, systems and methods have been described that provide for the connection of a remote-control adapter to a computing device via a commonly available connector such as a USB Type-C connector, and leverages a messaging technique used with that commonly available connector in order to allow a remote-control power button device to be utilized to control the power state of the computing device. For example, the remote-control power button device may be communicatively coupled to the remote-control adapter via a wired or wireless communication channel, and the computing device may include a USB Type-C connector that is connected to the remote-control adapter. A power delivery controller in the computing device may receive a remote-control power state change message from the remote-control power button device via the USB Type-C connector and the remote-control adapter and, in response, change a power state stored in the power delivery controller, and generate and transmit an alert. A system controller in the computing device may then receive the alert from the power delivery controller and, in response, access the power delivery controller to identify the power state stored in the power delivery controller, and perform at least one power state change operation based on the power state. As such, remote power control functionality may be provided for computing device without the need for dedicated remote power control connectors. Furthermore, one of skill in the art in possession of the present disclosure will appreciate that the computing device subsystems that provide the remote-control power state change functionality described above do not add cost to the computing device, and thus all of the cost of adding the remote-control power state change functionality of the present disclosure to a computing device comes from the "add-on" remote-control adapter and "add-on" remote-control device (i.e., "add-on" components to a base-level computing device).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device remote control system, comprising:
   a remote-control device;
   a remote-control adapter that is communicatively coupled to the remote-control device; and
   a computing device including:
      a computing device Universal Serial Bus (USB) connector that is connected to the remote-control adapter;
      a power function controller that is coupled to the computing device USB connector and configured to:
         receive a remote-control message from the remote-control device via the computing device USB connector and the remote-control adapter and;
         change, in response to receiving the remote-control message, a first power control function state stored in the power function controller to provide a second power control function state stored in the power function controller; and
         generate and transmit an alert; and
      a system controller that is coupled to the power function controller and configured to:
         receive, from the power function controller, the alert;
         access, in response to receiving the alert, the power function controller to identify the second power control function state stored in the power function controller; and
         perform at least one power control operation on the computing device based on the second power control function state.

2. The system of claim 1, wherein the remote-control adapter is communicatively coupled to the remote-control device via cabling.

3. The system of claim 1, wherein the remote-control adapter is communicatively coupled to the remote-control device via a wireless communication channel.

4. The system of claim 3, wherein the remote-control device is configured to:
   generate the remote-control message;
   sign the remote-control message with a private key to provide a digital signature with the remote-control message; and
   wirelessly transmit the remote-control message to the remote-control adapter via the wireless communication channel, wherein the remote-control adapter is configured to verify that the remote-control message was sent by the remote-control device using the digital signature.

5. The system of claim 3, wherein the system controller is configured to:
   identify a wireless mode for the remote-control adapter; and
   configure the remote-control adapter based on the wireless mode.

6. The system of claim 1, wherein the remote-control message is a remote power control message, the first power control function state and the second power control function state are different power states for the computing device, and the at least one power control operation includes a power state change operation.

7. The system of claim 6, wherein the at least one power control operation includes a power indicator change operation.

8. An Information Handling System (IHS), comprising:
at least one processing system; and
at least one memory system that is coupled to the at least one processing system and that includes instructions that, when executed by the at least one processing system, cause the at least one processing system to provide at least one controller engine that is configured to:
receive a remote-control message from a remote-control device via a Universal Serial Bus (USB) connector and a remote-control adapter that is connected to the USB connector and that is communicatively coupled to the remote-control device;
change, in response to receiving the remote-control message, a first power control function state stored in a database to provide a second power control function state stored in the database;
generate an alert;
access, in response to the alert, the second power control function state stored in the database; and
perform at least one power control operation on the IHS based on the second power control function state.

9. The IHS of claim 8, wherein the remote-control adapter is communicatively coupled to the remote-control device via cabling.

10. The IHS of claim 8, wherein the remote-control adapter is communicatively coupled to the remote-control device via a wireless communication channel.

11. The IHS of claim 10, wherein the at least one controller is configured to:
identify a wireless mode for the remote-control adapter; and
configure the remote-control adapter based on the wireless mode.

12. The IHS of claim 8, wherein the remote-control message is a remote power control message, the first power control function state and the second power control function state are different power states for the IHS, and the at least one power control operation includes a power state change operation.

13. The IHS of claim 12, wherein the at least one power control operation includes a power indicator change operation.

14. A method for remotely controlling a computing device, comprising:
receiving, by a power function controller in a computing device, a remote-control message from a remote-control device via a USB connector on the computing device and a remote-control adapter that is connected to the USB connector and that is communicatively coupled to the remote-control device;
changing, by the power function controller in the computing device in response to receiving the remote-control message, a first power control function state stored in the power function controller to provide a second power control function state stored in the power function controller;
generating and transmitting, by the power function controller in the computing device, an alert;
receiving, by a system controller in the computing device from the power function controller in the computing device, the alert;
accessing, by the system controller in the computing device in response to receiving the alert, the power function controller to identify the second power control function state stored in the power function controller; and
performing, by the system controller in the computing device, at least one power control operation based on the second power control function state.

15. The method of claim 14, wherein the remote-control adapter is communicatively coupled to the remote-control device via cabling.

16. The method of claim 14, wherein the remote-control adapter is communicatively coupled to the remote-control device via a wireless communication channel.

17. The method of claim 16, further comprising:
generating, by the remote-control device, the remote-control message;
signing, by the remote-control device, the remote-control message with a private key to provide a digital signature with the remote-control message; and
wirelessly transmitting, by the remote-control device, the remote-control message to the remote-control adapter via the wireless communication channel, wherein the remote-control adapter is configured to verify that the remote-control message was sent by the remote-control device using the digital signature.

18. The method of claim 16, further comprising:
identifying, by the system controller in the computing device, a wireless mode for the remote-control adapter; and
configuring, by the system controller in the computing device, the remote-control adapter based on the wireless mode.

19. The method of claim 14, wherein the remote-control message is a remote power control message, the first power control function state and the second power control function state are different power states for the computing device, and the at least one power control operation includes a power state change operation.

20. The method of claim 19, wherein the at least one power control operation includes a power indicator change operation.

* * * * *